(12) United States Patent
Matsuda et al.

(10) Patent No.: US 11,533,148 B2
(45) Date of Patent: Dec. 20, 2022

(54) COMMUNICATION DEVICE AND COMMUNICATION METHOD

(71) Applicant: SONY CORPORATION, Tokyo (JP)

(72) Inventors: Hiroki Matsuda, Tokyo (JP); Naoki Kusashima, Tokyo (JP)

(73) Assignee: SONY CORPORATION, Tokyo (JP)

( * ) Notice: Subject to any disclaimer, the term of this patent is extended or adjusted under 35 U.S.C. 154(b) by 80 days.

(21) Appl. No.: 17/049,872

(22) PCT Filed: Apr. 23, 2019

(86) PCT No.: PCT/JP2019/017304
§ 371 (c)(1),
(2) Date: Oct. 22, 2020

(87) PCT Pub. No.: WO2019/216212
PCT Pub. Date: Nov. 14, 2019

(65) Prior Publication Data
US 2021/0367735 A1  Nov. 25, 2021

(30) Foreign Application Priority Data
May 10, 2018 (JP) .............................. JP2018-091514

(51) Int. Cl.
*H04L 5/00* (2006.01)
*H04J 11/00* (2006.01)

(52) U.S. Cl.
CPC .................................. *H04L 5/0053* (2013.01)

(58) Field of Classification Search
CPC ......... H04L 5/0053; H04L 5/003; H04L 5/04; H04L 5/0058; H04J 11/0036
See application file for complete search history.

(56) References Cited

U.S. PATENT DOCUMENTS

| | | | |
|---|---|---|---|
| 2014/0086372 A1* | 3/2014 | Kishiyama | H04B 1/10 375/346 |
| 2017/0230138 A1* | 8/2017 | Xiong | H04W 72/0453 |
| 2017/0244535 A1* | 8/2017 | Islam | H04W 72/1263 |
| 2018/0184413 A1* | 6/2018 | Rong | H04W 76/10 |

(Continued)

FOREIGN PATENT DOCUMENTS

| | | |
|---|---|---|
| CN | 103493380 A | 1/2014 |
| CN | 108886417 A | 11/2018 |

(Continued)

OTHER PUBLICATIONS

International Search Report and Written Opinion of PCT Application No. PCT/JP2019/017304, dated Jul. 23, 2019, 09 pages of ISRWO.

(Continued)

*Primary Examiner* — Diane L Lo
*Assistant Examiner* — Abusayeed M Haque
(74) *Attorney, Agent, or Firm* — Chip Law Group

(57) ABSTRACT

A communication device (20) includes a processing unit (232) that performs a NOMA transmission process on a partial range of transmission data to be transmitted to another communication device (40), the NOMA transmission process being signal processing for non-orthogonal multiple access, and a transmitting unit (235) that transmits data obtained after the NOMA transmission process to the another communication device.

17 Claims, 24 Drawing Sheets

(56) References Cited

U.S. PATENT DOCUMENTS

2019/0320476 A1* 10/2019 Wang .................... H04W 76/15
2020/0059324 A1*  2/2020 Martin .................. H04L 1/1874
2020/0145141 A1*  5/2020 Park ......................... H04L 5/00

FOREIGN PATENT DOCUMENTS

| CN | 109075933 A | 12/2018 |
|---|---|---|
| EP | 3439208 A1 | 2/2019 |
| JP | 5869836 B2 | 2/2016 |
| JP | 6207637 B2 | 10/2017 |
| JP | 2019-511164 A | 4/2019 |
| WO | 2012/161079 A1 | 11/2012 |
| WO | 2017/143925 A1 | 8/2017 |
| WO | 2017/169367 A1 | 10/2017 |

OTHER PUBLICATIONS

"Transmitter Side Signal Processing Schemes for NOMA", Qualcomm Incorporated, 3GPP TSG RAN WG1, Meeting 92bis, Sanya, China, Apr. 16-20, 2018, R1-1804823, 11 pages.

* cited by examiner

FIG.9

| | SUBCARRIER SPACING | MAXIMUM BANDWIDTH | CP LENGTH TYPE | NUMBER OF SYMBOLS | SUBFRAME LENGTH | RADIO FRAME LENGTH | NUMBER OF SUBCARRIERS |
|---|---|---|---|---|---|---|---|
| PARAMETER SET 0 | 15kHz | 20MHz | TYPE 1 | 14 | 1ms | 10ms | 12 |
| PARAMETER SET 1 | 7.5kHz | 1.4MHz | TYPE 1 | 70 | 10ms | 10ms | 24 |
| PARAMETER SET 2 | 30kHz | 80MHz | TYPE 1 | 7 | 0.25ms | 10ms | 6 |
| PARAMETER SET 3 | 15kHz | 20MHz | TYPE 2 | 12 | 1ms | 10ms | 12 |
| ... | ... | ... | ... | ... | ... | ... | ... |

COMMUNICATION DEVICE AND COMMUNICATION METHOD

CROSS REFERENCE TO RELATED APPLICATIONS

This application is a U.S. National Phase of International Patent Application No. PCT/JP2019/017304 filed on Apr. 23, 2019, which claims priority benefit of Japanese Patent Application No. JP 2018-091514 filed in the Japan Patent Office on May 10, 2018. Each of the above-referenced applications is hereby incorporated herein by reference in its entirety.

FIELD

The present disclosure relates to a communication device, a communication method, and a communication program.

BACKGROUND

There is known mobile communication using radio access technologies, such as cellular communication technologies. In such a radio access technology, high frequency utilization efficiency is required in order to support various use cases. A non-orthogonal multiple access (NOMA) technology has attracted attention as one of the technologies for improving frequency utilization efficiency.

CITATION LIST

Non Patent Literature

Non-Patent Literature 1: "Transmitter side signaling processing schemes for NOMA", 3GPP RAN1 R1-1804823, Qualcomm Incorporated, April 2018

SUMMARY

Technical Problem

However, simply applying the non-orthogonal multiple access technology to a conventional radio access technology does not always achieve high frequency utilization efficiency. For example, in order to achieve high frequency utilization efficiency, it is necessary to efficiently non-orthogonally multiplex various transmission signals on a predetermined time-frequency resource. However, it is not easy to efficiently multiplex various transmission signals.

Therefore, the present disclosure proposes a communication device, a communication method, and a communication program that are configured to achieve high frequency utilization efficiency.

Solution to Problem

To solve the above problem, a communication device according to an embodiment of the present disclosure includes: a processing unit that performs a NOMA transmission process on a partial range of transmission data to be transmitted to another communication device, the NOMA transmission process being signal processing for non-orthogonal multiple access; and a transmitting unit that transmits data obtained after the NOMA transmission process to the another communication device.

Advantageous Effects of Invention

According to the present disclosure, high frequency utilization efficiency can be achieved. It should be noted that the effect is not necessarily limited to this description and may have any effect described in the present disclosure.

BRIEF DESCRIPTION OF DRAWINGS

FIG. 9 is a diagram illustrating an example of parameter sets related to transmission signals in an NR cell.

DESCRIPTION OF EMBODIMENTS

Figure 1:
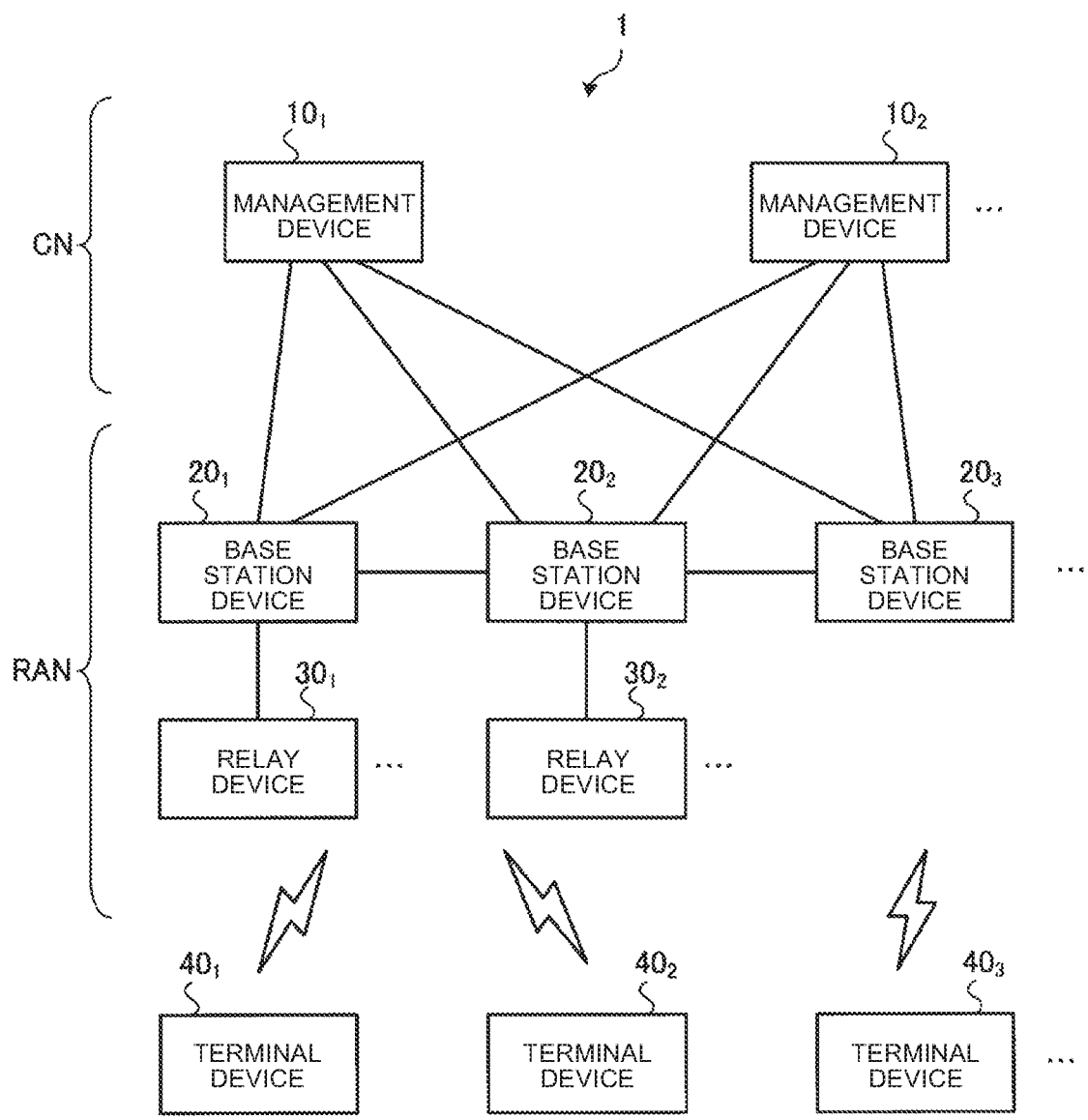
FIG. 1 is a diagram illustrating a configuration example of a communication system according to an embodiment of the present disclosure.

Embodiments of the present disclosure will be described below in detail with reference to the drawings. Note that in each of the following embodiments, the same portions are denoted by the same reference symbols, and a repetitive description thereof will be omitted.

Furthermore, in the present description and the drawings, a plurality of components having substantially the same functional configurations will be distinguished by giving the same reference symbols followed by different numerals in some cases. For example, a plurality of components having substantially the same functional configuration is distinguished as necessary, such as terminal devices $40_1$, $40_2$, and $40_3$. However, in a case where there is no need to particularly distinguish the plurality of components having substantially the same functional configuration, the components are denoted by the same reference numeral alone. For example, when it is not necessary to particularly distinguish the terminal devices $40_1$, $40_2$, and $40_3$ from each other, the terminal devices are simply referred to as terminal devices 40.

Furthermore, the present disclosure will be described according to the following items.
1. Introduction
2. Configuration of communication system
2-1. Overall configuration of communication system
2-2. Configuration of management device
2-3. Configuration of base station device
2-4. Configuration of relay device
2-5. Configuration of terminal device
2-6. Radio frame configuration
3. About NOMA
3-1. Transmitting and receiving data by using NOMA
3-2. Efficient use of MA resources
3-3. Specific examples of NOMA application range
4. Operations of communication system
4-1. transmission/reception process (grant based)
4-2. transmission/reception process (grant-free)
4-3. transmission/reception process (downlink)
5. Modifications
5-1. Modifications of transmission/reception process
5-2. Modifications of NOMA application range
5-3. Other modifications
<6. Conclusion>

1. INTRODUCTION

Radio access technologies (RATs) such as Long Term Evolution (LTE) and New Radio (NR) have been studied in 3rd Generation Partnership Project (3GPP). Each of LTE and NR is a type of cellular communication technology and enables mobile communication of a terminal device by arranging areas covered by base stations in the form of cells. Note that in the following description, "LTE" includes LTE-Advanced (LTE-A), LTE-Advanced Pro (LTE-A Pro), and Evolved Universal Terrestrial Radio Access (EUTRA). In addition, NR includes New Radio Access Technology (NRAT) and Further EUTRA (FEUTRA). Note that a single base station may manage a plurality of cells. In the following description, a cell corresponding to LTE is referred to as an LTE cell, and a cell corresponding to NR is called an NR cell.

NR is a radio access technology (RAT) of the next generation (fifth generation) of LTE. NR is a radio access technology that is configured to support various use cases including enhanced mobile broadband (eMBB), massive machine type communications (mMTC), and ultra-reliable and low latency communications (URLLC). NR has been studied for a technical framework that addresses usage scenarios, requirement conditions, and deployment scenarios in these use cases.

Non-orthogonal multiple access (NOMA) is one of the technologies having been studied in NR. This is a technology for improving frequency utilization efficiency by using a non-orthogonal resource in addition to an orthogonal resource.

The orthogonal resource includes, for example, time (e.g., subframes, slots, radio frames), frequency (e.g., component carriers, subcarriers, subchannels, resource blocks), an orthogonal code, or the like. Furthermore, the non-orthogonal resource includes, for example, space, power, interleaving (e.g., bit interleaving, symbol interleaving), data rate, code (e.g., sparse code, spreading codebook), or the like. Here, the space includes, for example, spatial streams, spatial layers, a spatial codebook, antennas, antenna ports, or the like. The orthogonal resource and the non-orthogonal resource are not limited to the above examples. In the following description, communication using a non-orthogonal resource (transmission, reception, or both thereof) may be referred to as NOMA communication.

Note that in the non-orthogonal multiple access, a plurality of transmission signals is non-orthogonal multiplexed on a predetermined orthogonal resource to improve frequency utilization efficiency. However, it is not easy to efficiently multiplex various transmission signals from various communication devices.

For example, it is assumed that there are four unused blocks on a predetermined time-frequency resource. At this time, the four blocks include two blocks that use a first non-orthogonal resource (e.g., first power pattern), and two blocks that use a second non-orthogonal resource (e.g., second power pattern corresponding to the first power pattern). If transmission data of four blocks is generated in a terminal device, a base station device cannot secure four blocks either on the first non-orthogonal resource or on the second non-orthogonal resource. In this configuration, the base station device has no choice but to secure four unused blocks on another time-frequency resource.

In addition, depending on a combination of transmission signals, the signals sometimes cannot be non-orthogonally multiplexed. For example, it is assumed that there are two terminal devices that each transmit a signal to a base station device. At this time, depending on a state of a terminal device, two transmission signals transmitted by the two terminal devices cannot be non-orthogonally multiplexed. For example, it is assumed that a non-orthogonal resource is power, and a non-orthogonal multiple access is achieved by multiplexing a transmission signal of large power and a transmission signal of small power on a transmission channel. Furthermore, it is assumed that both of the two terminal devices are located away from the base station device and that both of signals transmitted from the two terminal devices have only small power when viewed from the base station device. At this time, the signals transmitted from the two terminal devices cannot be non-orthogonally multiplexed on the same orthogonal resource (e.g. on the same time/frequency axis).

In order to improve the frequency utilization efficiency, it is necessary to efficiently combine a plurality of transmission signals. However, in the presence of many communication devices in various states, it is not easy to efficiently combine transmission signals.

Therefore, object of the embodiments described below is to make it possible to flexibly change a range (application unit) applied to a NOMA transmission process within one piece of transmission data (or transmission unit data such as a transport block). Here, the NOMA transmission process represents signal processing performed by a communication device on transmission data (or transmission unit data), for non-orthogonal multiple access, and, for example, the signal processing is performed to allocate transmission data (or transmission unit data) onto a non-orthogonal resource. As an example, the NOMA transmission process is a process of converting a transmission signal into a transmission signal having a desired power level. As a matter of course, the NOMA transmission process is not limited to conversion in power level.

Flexible change of the range applied to a NOMA transmission process within one piece of transmission data (or within transmission unit data) makes it possible to improve the flexibility in combination of transmission signals. Therefore, a communication system can efficiently combine transmission signals, and thus, the frequency utilization efficiency of the system can be improved as a whole.

2. CONFIGURATION OF COMMUNICATION SYSTEM

Hereinafter, a communication system 1 according to an embodiment of the present disclosure will be described. The communication system 1 includes a base station and provides radio communication using NOMA to a terminal device. A non-terrestrial network of the communication system 1 is, for example, a radio network that uses a radio access method defined in NR. As a matter of course, the communication system 1 may include a radio network using a radio access method other than the NR.

In the following description, the concept of base station (hereinafter, also referred to as a base station device) includes a relay station (hereinafter also referred to as a relay device). Furthermore, the concept of base station includes not only a structure with a function of a base station but also a device installed at the structure. The structure includes, for example, a building such as a high-rise building, house, steel tower, station facility, airport facility, harbor facility, or a stadium. Note that the concept of structure includes not only a building but also a non-building structure such as a tunnel, bridge, dam, fence, steel column, or a facility such as a crane, gate, or windmill. In addition, the concept of structure includes not only a structure on the ground (on land) or under the ground but also a structure on water such as a pier or megafloat, or a structure under water such as an ocean observation facility.

Furthermore, the base station device may be a base station device configured to be movable. For example, the base station device may be a device installed at a mobile body or the mobile body itself. The mobile body may be a mobile terminal such as a smartphone. The mobile body may be a mobile body (e.g., a vehicle such as an automobile, bus, truck, train, or linear motor car) that moves on the ground (on land) or a mobile body (e.g., subway) that moves under the ground (e.g., in a tunnel). Furthermore, the mobile body may be a mobile body (e.g., a ship such as a passenger ship, cargo ship, or hovercraft) that moves on water or a mobile body (e.g., a submersible ship such as a submersible vessel, submarine boat, or unmanned submersible) that moves under water. Still furthermore, the mobile body may be a mobile body (e.g., an aircraft such as an airplane, airship, or drone) that moves in the atmosphere or a mobile body (e.g., an artificial celestial body such as an artificial satellite, spacecraft, space station, or probe vehicle) that moves above the atmosphere.

Note that a base station for LTE may be referred to as an evolved Node B (eNodeB or eNB). Furthermore, a base station for NR may be referred to as a gNodeB or gNB. Still furthermore, in LTE and NR, a terminal device (also referred to as a mobile station, a mobile station device, or a terminal) may be referred to as a user equipment (UE). Note that the terminal device is a type of communication device and is also referred to as a mobile station, mobile station device, or a terminal. In the embodiments of the present disclosure, the concept of communication device includes not only a portable terminal device such as a mobile terminal but also, for example, a device installed at a structure or mobile body. Furthermore, the concept of communication device includes not only a terminal device but also a base station device and a relay device.

<2-1. Overall Configuration of Communication System>

FIG. 1 is a diagram illustrating a configuration example of the communication system 1 according to an embodiment of the present disclosure. The communication system 1 includes a management device 10, a base station device 20, a relay device 30, and a terminal device 40. The communication system 1 provides, for users, a radio network through which mobile communication can be performed by operating radio communication devices constituting the communication system 1 in cooperation with each other. The radio communication devices are a device having a radio communication function and correspond to the base station device 20, the relay device 30, and the terminal device 40 in the example of FIG. 1.

The communication system 1 may include a plurality of management devices 10, base station devices 20, relay devices 30, and terminal devices 40. In the example of FIG. 1, the communication system 1 includes management devices $10_1$, $10_2$, and the like as the management device 10. Furthermore, the communication system 1 includes base station devices $20_1$, $20_2$, $20_3$, and the like as the base station device 20, and relay devices $30_1$, $30_2$, and the like as the relay device 30. Still furthermore, the communication system 1 includes terminal devices $40_1$, $40_2$, $40_3$, and the like as the terminal device 40.

The management device 10 is a device that manages the radio network. For example, the management device 10 is a device that functions as a mobility management entity (MME) or an access and mobility management function (AMF). The management devices 10 constitute a core network CN. The core network CN includes, for example, an evolved packet core (EPC) or a 5G core network (5GC). The management devices 10 are connected to the plurality of base station devices 20. The management devices 10 manage the communication of the base station devices 20.

Each of the base station devices 20 is a base station device that establishes radio communication with a terminal device 40. The base station device 20 is configured to perform NOMA communication with the terminal device 40. The base station device 20 may be configured to perform NOMA communication with another base station device 20 and relay device 30.

The base station device 20 may include a ground base station device (ground station device) installed on the ground. For example, the base station device 20 may include a base station device arranged in a structure on the ground or a base station device installed in a mobile body moving on the ground. More specifically, the base station device 20 may include an antenna installed in a structure such as a building and a signal processing device connected to the antenna. As a matter of course, the base station device 20 may include the structure or the mobile body itself. "On the ground" represents not only on the ground (on land) but also under the ground, on water, and under water in a broad sense. Note that the base station device 20 is not limited to the ground base station device. The base station device 20 may be a non-ground base station device (non-ground station device) that is configured to float in the air or in space. For example, the base station device 20 may include an aircraft station device or a satellite station device.

The aircraft station device is a radio communication device that is configured to float in the atmosphere, such as an aircraft. The aircraft station device may include a device mounted on an aircraft or the like or may be the aircraft itself. Note that the concept of aircraft includes not only a heavier-than-air aircraft such as an airplane or glider, but also a lighter-than-air aircraft such as a balloon or airship. Furthermore, the concept of aircraft includes not only the heavier-than-air aircraft or lighter-than-air aircraft, but also a rotorcraft such as a helicopter or autogyro. Note that the aircraft station device (or an aircraft on which the aircraft station device is mounted) may include an unmanned aircraft such as a drone. The concept of unmanned aircraft includes unmanned aircraft systems (UAS) or tethered UAS. Furthermore, the concept of unmanned aircraft includes a lighter than air UAS (LTA) or a heavier than air UAS (HTA). In addition, the concept of unmanned aircraft also includes high altitude UAS Platforms (HAPs).

The satellite station device is a radio communication device that is configured to float above the atmosphere. The satellite station device may be a device mounted on a space vehicle such as an artificial satellite or may be the space vehicle itself. A satellite serving as the satellite station device may be any of a low earth orbiting (LEO) satellite, medium earth orbiting (MEO) satellite, geostationary earth orbiting (GEO) satellite, and highly elliptical orbiting (HEO) satellite. As a matter of course, the satellite station device may be a device mounted on the low earth orbiting satellite, medium earth orbiting satellite, geostationary earth orbiting satellite, or highly elliptical orbiting satellite.

Note that, in the example of FIG. 1, the base station device $20_1$ is connected to the relay device $30_1$, and the base station device $20_2$ is connected to the relay device $30_2$. The base station device $20_1$ is configured to indirectly establish radio communication with a terminal device 40 via the relay device $30_1$. Similarly, the base station device $20_2$ is configured to indirectly establish radio communication with a terminal device 40 via the relay device $30_2$.

Each of the relay devices 30 is a device that serves as a relay station for each base station. The relay device 30 is a type of base station device. The relay device 30 is configured to perform NOMA communication with a terminal device 40. The relay device 30 relays communication between the base station device 20 and a terminal device 40. Note that the relay device 30 may be configured to perform NOMA communication with another relay device 30 and base station device 20. The relay device 30 may be a ground station device or a non-ground station device. The relay devices 30 constitute a radio access network RAN together with the base station devices 20.

Each of the terminal devices 40 is, for example, a mobile phone, a smart device (smartphone or tablet), a personal digital assistant (PDA), or a personal computer. Furthermore, the terminal device 40 may include a machine to machine (M2M) device or an Internet of Things (IoT) device. Furthermore, the terminal device 40 may be a radio communication device installed on a mobile body or the mobile body itself. The terminal device 40 is configured to perform NOMA communication with a base station device 20 and a relay device 30. Note that the terminal device 40 may be configured to perform NOMA communication even in communication (sidelink) with another terminal device 40.

Hereinafter, the configurations of respective devices constituting the communication system 1 according to an embodiment will be specifically described.

<2-2. Configuration of Management Device>

The management device 10 is a device that manages the radio network. For example, the management device 10 is a device that manages the communication of the base station devices 20. When the core network is EPC, the management device 10 is, for example, a device having a function as a mobility management entity (MME). When the core network is 5GC, the management device 10 is, for example, a device having a function as an access and mobility management function (AMF).

Note that the management device 10 may have a gateway function. For example, when the core network is EPC, the management device 10 may have a function as a serving gateway (S-GW) or a packet data network gateway (P-GW). Furthermore, when the core network is 5GC, the management device 10 may have a function as a user plane function (UPF). Note that the management device 10 may not necessarily be a device that constitutes the core network. For example, it is assumed that the core network employs wideband code division multiple access (W-CDMA) or code division multiple access 2000 (cdma2000). At this time, the management device 10 may be a device that functions as a radio network controller (RNC).

Figure 2:
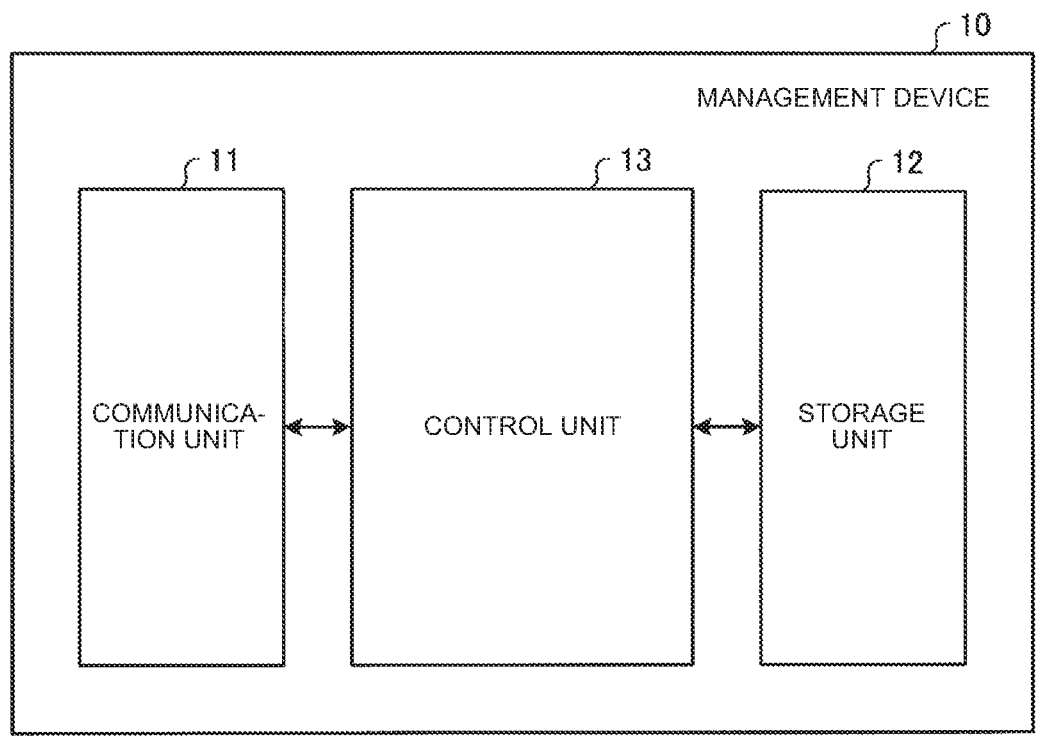
FIG. 2 is a diagram illustrating a configuration example of a management device according to an embodiment of the present disclosure.

FIG. 2 is a diagram illustrating a configuration example of the management device 10 according to an embodiment of the present disclosure. The management device 10 includes a communication unit 11, a storage unit 12, and a control unit 13. Note that the configuration illustrated in FIG. 2 represents a functional configuration, and the management device 10 may have a hardware configuration different from this. Furthermore, the functions of the management device 10 may be distributed and implemented in a plurality of physically separated configurations. For example, the management device 10 may be constituted by a plurality of server devices.

The communication unit 11 is a communication interface for communicating with another device. The communication unit 11 may be a network interface or a device connection interface. For example, the communication unit 11 may include a local area network (LAN) interface such as a network interface card (NIC) or may be a universal serial bus (USB) interface including a USB host controller, a USB port, and the like. The communication unit 11 may be a wired interface or a wireless interface. The communication unit 11 functions as communication means for the management device 10. The communication unit 11 communicates with a base station device 20 according to the control of the control unit 13.

The storage unit 12 is a data readable/writable storage device such as a dynamic random access memory (DRAM), static random access memory (SRAM), flash memory, or hard disk. The storage unit 12 functions as storage means for the management device 10. The storage unit 12 stores, for example, a connection status of a terminal device 40. For example, the storage unit 12 stores states of radio resource control (RRC) and EPS connection management (ECM) of the terminal device 40. The storage unit 12 may function as a home memory that stores position information indicating the positions of the terminal devices 40.

The control unit 13 is a controller that controls each unit of the management device 10. The control unit 13 is achieved by a processor such as a central processing unit (CPU) or a micro processing unit (MPU). For example, the control unit 13 is achieved in such a manner that the processor executes various programs stored in the storage device inside the management device 10 by using a random access memory (RAM) or the like as a work area. Note that the control unit 13 may be achieved by an integrated circuit such as an application specific integrated circuit (ASIC) or a field programmable gate array (FPGA). The CPU, MPU, ASIC, and FPGA can all be regarded as controllers.

<2-3. Configuration of Base Station Device>

Figure 3:
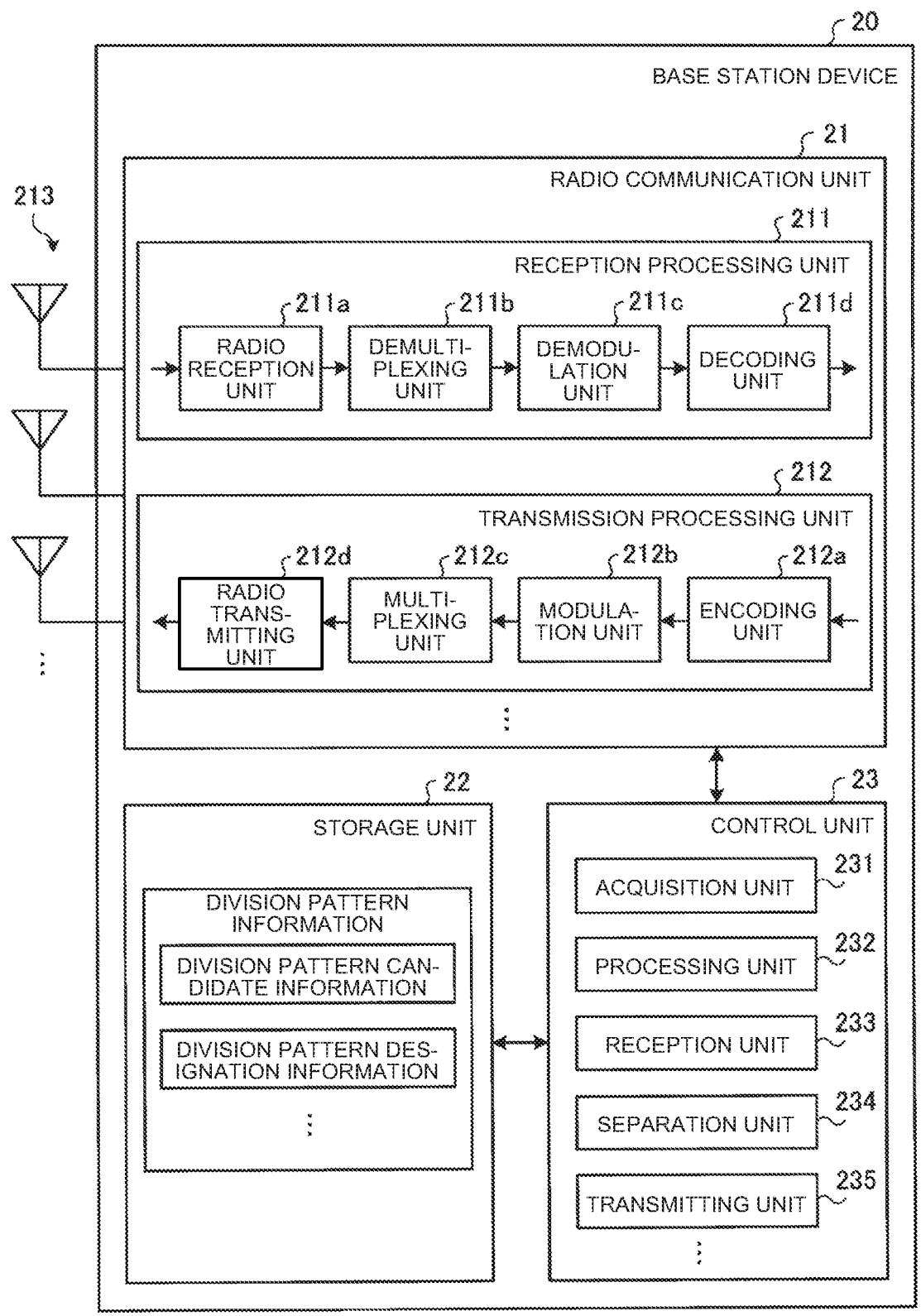
FIG. 3 is a diagram illustrating a configuration example of a base station device according to an embodiment of the present disclosure.

Next, the configuration of a base station device will be described. FIG. 3 is a diagram illustrating a configuration example of a base station device 20 according to an embodiment of the present disclosure. The base station device 20 is configured to perform NOMA communication with a terminal device 40. The base station device 20 includes a radio communication unit 21, a storage unit 22, and a control unit 23. Note that the configuration illustrated in FIG. 3 represents a functional configuration, and the base station device 20 may have a hardware configuration different from this. Furthermore, the functions of the base station device 20 may be distributed and implemented in a plurality of physically separated configurations.

The radio communication unit 21 is a radio communication interface that establishes radio communication with another radio communication devices (e.g., a terminal device 40 or relay device 30). The radio communication unit 21 operates according to the control of the control unit 23. The radio communication unit 21 supports one or more radio access methods. For example, the radio communication unit 21 supports both of NR and LTE. The radio communication unit 21 may support W-CDMA or cdma2000 in addition to NR and LTE. Furthermore, the radio communication unit 21 supports communication using NOMA. The NOMA will be described in detail later.

The radio communication unit 21 includes a reception processing unit 211, a transmission processing unit 212, and an antenna 213. The radio communication unit 21 may include a plurality of reception processing units 211, transmission processing units 212, and antennas 213. Note that when the radio communication unit 21 supports a plurality of radio access methods, each unit of the radio communication unit 21 can be individually configured for each of the radio access methods. For example, the reception processing unit 211 and the transmission processing unit 212 may be configured individually for LTE and NR.

The reception processing unit 211 performs processing for an uplink signal received via the antenna 213. The reception processing unit 211 includes a radio reception unit 211a, a demultiplexing unit 211b, a demodulation unit 211c, and a decoding unit 211d.

The radio reception unit 211a performs, on an uplink signal, down-convert, removal of an unnecessary frequency component, control of an amplification level, quadrature demodulation, conversion to a digital signal, removal of a guard interval, and extraction of a frequency domain signal by fast Fourier transform, or the like. The demultiplexing unit 211b demultiplexes an uplink reference signal and an uplink channel such as physical uplink shared channel (PUSCH) and physical uplink control channel (PUCCH) from a signal output from the radio reception unit 211a. The demodulation unit 211c performs demodulation of a received signal by using a modulation method such as binary phase shift keying (BPSK) or quadrature phase shift keying (QPSK), on a modulated symbol on an uplink channel. The modulation method used by the demodulation unit 211c may include 16 quadrature amplitude modulation (QAM), 64QAM, or 256QAM. The decoding unit 211d performs decoding processing on a demodulated, encoded bits on an uplink channel. Decoded uplink data and uplink control information are output to the control unit 23.

The transmission processing unit 212 performs transmission processing for downlink control information and downlink data. The transmission processing unit 212 includes an encoding unit 212a, a modulation unit 212b, a multiplexing unit 212c, and a radio transmitting unit 212d.

The encoding unit 212a performs encoding of downlink control information and downlink data that are input from the control unit 23, by using an encoding method such as convolutional encoding, convolutional encoding, or turbo encoding. The modulation unit 212b modulates encoded bits output from the encoding unit 212a by using a predetermined modulation method such as BPSK, QPSK, 16QAM, 64QAM, or 256QAM. The multiplexing unit 212c multiplexes a modulated symbol and a downlink reference signal for each channel so as to be arranged in a predetermined resource element. The radio transmitting unit 212d performs various signal processing on a signal from the multiplexing unit 212c. For example, the radio transmitting unit 212d performs processing such as conversion to a time domain by using fast Fourier transformation, addition of a guard interval, generation of a baseband digital signal, conversion to an analog signal, quadrature modulation, up-conversion, removal of an unnecessary frequency component, or amplification of power. A signal generated by the transmission processing unit 212 is transmitted from the antenna 213.

The storage unit 22 is a data readable/writable storage device such as a DRAM, SRAM, flash memory, or hard disk. The storage unit 22 functions as storage means for the base station device 20. The storage unit 22 stores division pattern information. The division pattern information is information used for dividing transmission unit data into a plurality of NOMA application ranges when the terminal device 40 transmits the transmission unit data. The transmission unit data is data serving as a transmission unit of transmission data generated in a communication device. For example, the transmission unit data is data serving as a unit of error correction for a transport block or the like. The division pattern information is transmitted from a base station device 20 to a terminal device 40. The division pattern information includes division pattern candidate information and division pattern designation information. The division pattern candidate information and the division pattern designation information will be described in detail later.

The control unit 23 is a controller that controls each unit of the base station device 20. The control unit 23 is achieved by a processor such as a central processing unit (CPU) or a micro processing unit (MPU). For example, the control unit 23 is achieved in such a manner that the processor executes various programs stored in the storage device inside the base station device 20 by using a random access memory (RAM) or the like as a work area. In addition, the control unit 23 may be achieved by an integrated circuit such as an application specific integrated circuit (ASIC) or a field programmable gate array (FPGA). The CPU, MPU, ASIC, and FPGA can all be regarded as controllers.

As illustrated in FIG. 3, the control unit 23 includes an acquisition unit 231, a processing unit 232, a reception unit 233, a separation unit 234, and a transmitting unit 235. Each of the respective blocks (the acquisition unit 231 to the transmitting unit 235) constituting the control unit 23 represents a functional block indicating a function of the control unit 23. These functional blocks may be software blocks or hardware blocks. For example, each of the functional blocks described above may be one software module achieved by software (including a microprogram) or one circuit block on a semiconductor chip (die). As a matter of course, each functional block may be one processor or one integrated circuit. Any method is employed for a method of configuring the functional blocks. Note that the control unit 23 may be constituted in units of functions different from the above functional blocks. The operation of each of the blocks (the acquisition unit 231 to the transmitting unit 235) constituting the control unit 23 will be described in detail in a description of a transmission/reception process (grant based, grant-free, downlink) and the like, which are described later.

<2-4. Configuration of Relay Device>

Figure 4:
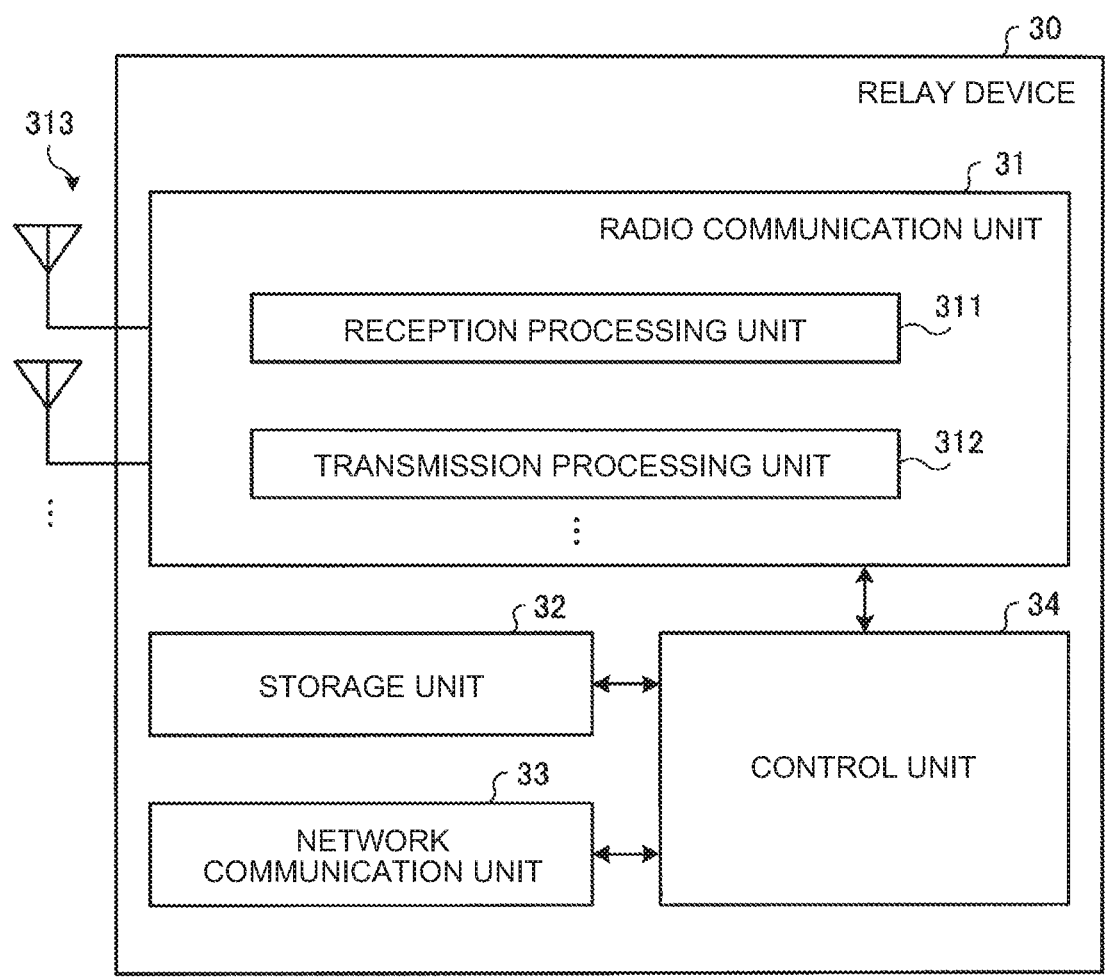
FIG. 4 is a diagram illustrating a configuration example of a relay device according to an embodiment of the present disclosure.

Next, the configuration of a relay device 30 will be described. FIG. 4 is a diagram illustrating a configuration example of a relay device 30 according to an embodiment of the present disclosure. The relay device 30 is configured to perform NOMA communication with a terminal device 40. The relay device 30 includes a radio communication unit 31, a storage unit 32, a network communication unit 33, and a control unit 34. Note that the configuration illustrated in FIG. 4 represents a functional configuration, and the relay device 30 may have a hardware configuration different from this. Furthermore, the functions of the relay device 30 may be distributed and implemented in a plurality of physically separated configurations.

The radio communication unit 31 is a radio communication interface that establishes radio communication with another radio communication devices (e.g., a base station device 20 or terminal device 40). The radio communication unit 31 operates according to the control of the control unit 34. The radio communication unit 31 includes a reception processing unit 311, a transmission processing unit 312, and an antenna 313. The configurations of the radio communication unit 31, the reception processing unit 311, the transmission processing unit 312, and the antenna 313 are similar to those of the radio communication unit 21, the reception processing unit 211, the transmission processing unit 212, and the antenna 213 of the base station device 20.

The storage unit 32 is a data readable/writable storage device such as a DRAM, SRAM, flash memory, or hard disk. The storage unit 32 functions as storage means for the relay device 30. The configuration of the storage unit 32 is similar to that of the storage unit 22 of the base station device 20.

The network communication unit 33 is a communication interface for communicating with another device. For example, the network communication unit 33 includes a LAN interface such as NIC. The network communication unit 33 may be a wired interface or a wireless interface. The network communication unit 33 functions as network communication means for the relay device 30. The network communication unit 33 communicates with a base station device 20 according to the control of the control unit 34.

The control unit 34 is a controller that controls each unit of the relay device 30. The configuration of the control unit 34 is similar to that of the control unit 23 of the base station device 20.

<2-5. Configuration of Terminal Device>

Figure 5:
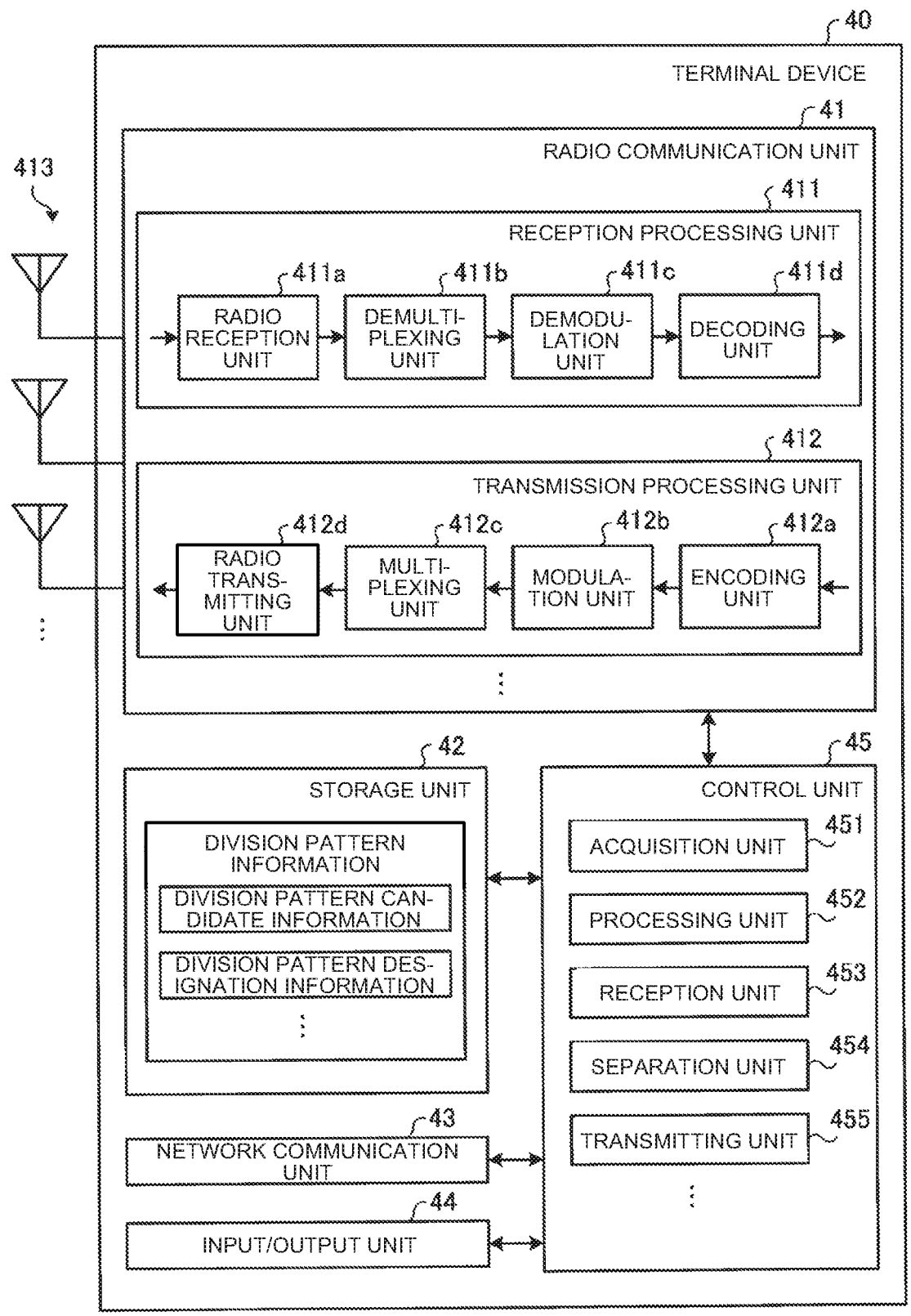
FIG. 5 is a diagram illustrating a configuration example of a terminal device according to an embodiment of the present disclosure.

Next, the configuration of a terminal device 40 will be described. FIG. 5 is a diagram illustrating a configuration example of a terminal device 40 according to an embodiment of the present disclosure. The terminal device 40 is configured to perform NOMA communication with a base station device 20 and a relay device 30. The terminal device 40 includes a radio communication unit 41, a storage unit 42, a network communication unit 43, an input/output unit 44, and a control unit 45. Note that the configuration illustrated in FIG. 5 represents a functional configuration, and the terminal device 40 may have a hardware configuration different from this. Furthermore, the functions of the terminal device 40 may be distributed and implemented in a plurality of physically separated configurations.

The radio communication unit 41 is a radio communication interface that establishes radio communication with another radio communication devices (e.g., a base station device 20 or relay device 30). The radio communication unit 41 operates according to the control of the control unit 45. The radio communication unit 41 supports one or more radio access methods. For example, the radio communication unit 41 supports both of NR and LTE. The radio communication unit 41 may support W-CDMA or cdma2000 in addition to NR and LTE. Furthermore, the radio communication unit 21 supports communication using NOMA. The NOMA will be described in detail later.

The radio communication unit 41 includes a reception processing unit 411, a transmission processing unit 412, and an antenna 413. The radio communication unit 41 may include a plurality of reception processing units 411, transmission processing units 412, and antennas 413. Note that when the radio communication unit 41 supports a plurality of radio access methods, each unit of the radio communication unit 41 can be individually configured for each of the radio access methods. For example, the reception processing unit 411 and the transmission processing unit 412 may be configured individually for LTE and NR.

The reception processing unit 411 performs processing for a downlink signal received via the antenna 413. The reception processing unit 411 includes a radio reception unit 411a, a demultiplexing unit 411b, a demodulation unit 411c, and a decoding unit 411d.

The radio reception unit 411a performs, on a downlink signal, down-convert, removal of an unnecessary frequency component, control of an amplification level, quadrature demodulation, conversion to a digital signal, removal of a guard interval, and extraction of a frequency domain signal by fast Fourier transform, or the like. The demultiplexing unit 411b demultiplexes a downlink channel, a downlink synchronization signal, and a downlink reference signal from a signal output from the radio reception unit 411a. The downlink channel includes, for example, a channel such as physical broadcast channel (PBCH), physical downlink shared channel (PDSCH), physical downlink control channel (PDCCH). The demodulation unit 211c performs demodulation of a received signal by using a modulation method such as BPSK, QPSK, 16QAM, 64QAM, or 256QAM, for a modulated symbol on a downlink channel. The decoding unit 411d performs decoding processing on a demodulated, encoded bits on a downlink channel. Decoded downlink data and downlink control information are output to the control unit 45.

The transmission processing unit 412 performs transmission processing for uplink control information and uplink data. The transmission processing unit 412 includes an encoding unit 412a, a modulation unit 412b, a multiplexing unit 412c, and a radio transmitting unit 412d.

The encoding unit 412a performs encoding of uplink control information and uplink data that are input from the control unit 45, by using an encoding method such as convolutional encoding, convolutional encoding, or turbo encoding. The modulation unit 412b modulates encoded bits output from the encoding unit 412a by using a predetermined modulation method such as BPSK, QPSK, 16QAM, 64QAM, or 256QAM. The multiplexing unit 412c multiplexes a modulated symbol and an uplink reference signal for each channel so as to be arranged in a predetermined resource element. The radio transmitting unit 412d performs various signal processing on a signal from the multiplexing unit 412c. For example, the radio transmitting unit 412d performs processing such as conversion to a time domain by using fast Fourier transformation, addition of a guard interval, generation of a baseband digital signal, conversion to an analog signal, quadrature modulation, up-conversion, removal of an unnecessary frequency component, or amplification of power. A signal generated by the transmission processing unit 412 is transmitted from the antenna 413.

The storage unit 42 is a data readable/writable storage device such as a DRAM, SRAM, flash memory, or hard disk. The storage unit 42 functions as storage means for the terminal device 40. The storage unit 42 stores division pattern information. The division pattern information is information used for dividing transmission unit data into a plurality of NOMA application ranges when the terminal device 40 transmits the transmission unit data. The division pattern information is acquired, for example, from the base station device 20. The division pattern information includes division pattern candidate information and division pattern designation information. The division pattern candidate information and the division pattern designation information will be described in detail later.

The network communication unit 43 is a communication interface for communicating with another device. For example, the network communication unit 43 includes a LAN interface such as NIC. The network communication unit 43 may be a wired interface or a wireless interface. The network communication unit 43 functions as network communication means for the terminal device 40. The network communication unit 43 communicates with another device according to the control of the control unit 45.

The input/output unit 44 is a user interface for exchanging information with the user. For example, the input/output unit 44 is an operation device, such as a keyboard, mouse, operation keys, or touch panel, through which various operations are performed by the user. Alternately, the input/output unit 44 is a display device such as a liquid crystal display or organic electroluminescence display. The input/output unit 44 may be a sound device such as a speaker or buzzer. The input/output unit 44 may be a lighting device such as a light emitting diode (LED) lamp. The input/output unit 44 functions as input/output means (input means, output means, operation means, or notification means) of the terminal device 40.

The control unit 45 is a controller that controls each unit of the terminal device 40. The control unit 45 is achieved by a processor such as a CPU or MPU. For example, the control unit 45 is achieved in such a manner that the processor executes various programs stored in the storage device inside the terminal device 40 by using RAM or the like as a work area. The control unit 45 may be achieved by an integrated circuit such as ASIC or FPGA. The CPU, MPU, ASIC, and FPGA can all be regarded as controllers.

As illustrated in FIG. 5, the control unit 45 includes an acquisition unit 451, a processing unit 452, a reception unit 453, a separation unit 454, and a transmitting unit 455. Each of the respective blocks (the acquisition unit 451 to the transmitting unit 455) constituting the control unit 45 represents a functional block indicating a function of the control unit 45. These functional blocks may be software blocks or hardware blocks. For example, each of the functional blocks described above may be one software module achieved by software (including a microprogram) or one circuit block on a semiconductor chip (die). As a matter of course, each functional block may be one processor or one integrated circuit. Any method is employed for a method of configuring the functional blocks. Note that the control unit 45 may be constituted in units of functions different from the above functional blocks. The operation of each of the blocks (the acquisition unit 451 to the transmitting unit 455) constituting the control unit 45 will be described in detail in a description of a transmission/reception process (grant based, grant-free, downlink), which are described later.

<2-6. Radio Frame Configuration>

Next, a radio frame configuration in the radio access network RAN will be described.

Figure 6:
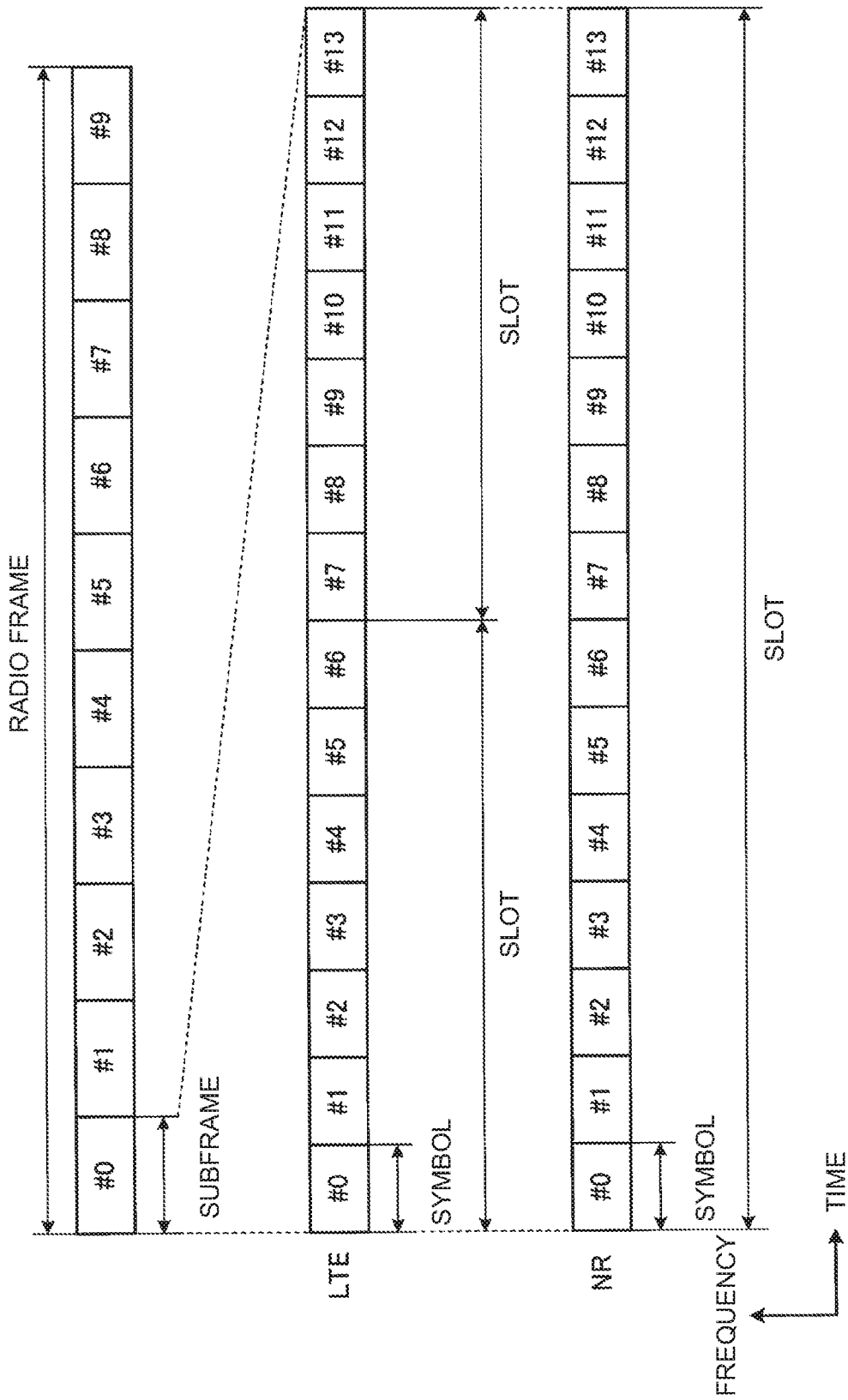
FIG. 6 is a diagram illustrating a radio frame configuration used in a radio access network, according to an embodiment of the present disclosure.

FIG. 6 is a diagram illustrating a radio frame configuration used in the radio access network RAN according to an embodiment of the present disclosure. In the radio access network RAN, a radio frame of 10 ms is defined. One radio frame includes 10 subframes. A subframe has a time interval of 1 ms. The subframe includes, for example, 14 symbols. Here, the symbols are, for example, OFDM symbols or SC-FDMA symbols. In LTE, for example, one slot includes seven symbols. In NR, for example, one slot includes 14 symbols. The subframe configurations in LTE and NR will be described below.

[Subframe Configuration in LTE]

Figure 7:
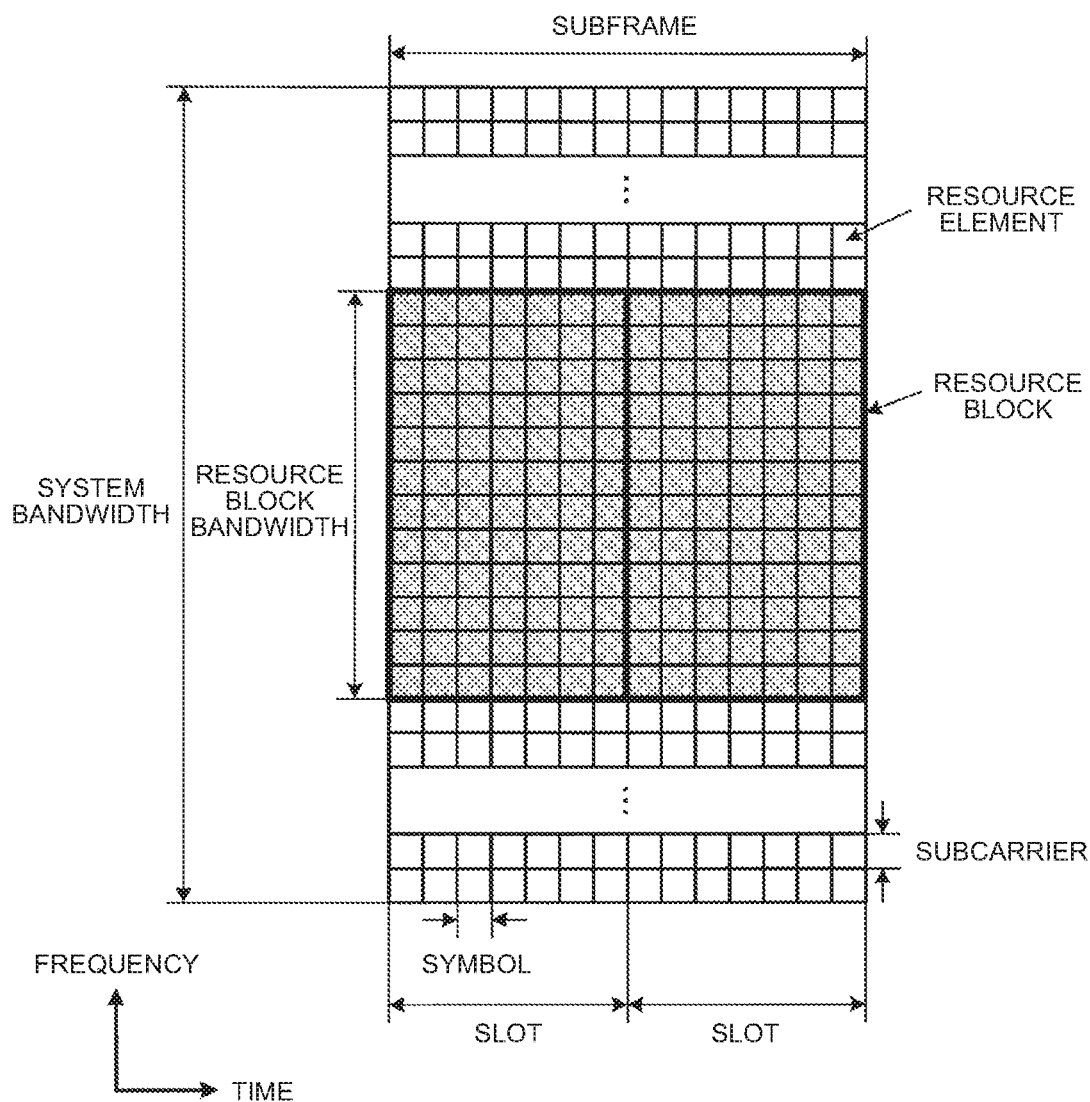
FIG. 7 is a diagram illustrating an example of a subframe configuration in LTE.

FIG. 7 is a diagram illustrating an example of a subframe configuration in LTE. In the example illustrated in FIG. 7, a resource grid is illustrated with the vertical axis representing frequency and the horizontal axis representing time. In the example illustrated in FIG. 7, a system bandwidth represents an LTE cell bandwidth. The resource grid includes a plurality of grids, each of which represents a resource element. One resource element has dimensions of one subcarrier in the frequency direction and one symbol in the time direction. In LTE, one slot is defined by a plurality of symbols. The number of symbols in one slot is determined according to the type of cyclic prefix (CP). The type of CP includes a normal CP or an extended CP. In the normal CP, one slot includes seven symbols. In the extended CP, one slot includes six symbols.

A resource block is used to map a certain physical channel (PDSCH, PUSCH, or the like) to the resource elements. One resource block is defined by a predetermined number of subcarriers continuous in the frequency domain and a predetermined number of symbols continuous in the time domain. The number of symbols and the number of subcarriers (resource block bandwidth) in one resource block are determined on the basis of the type of CP in a cell, a subcarrier spacing and/or a parameter that is set depending on an upper layer, and the like. For example, when the type of CP is the normal CP and the subcarrier spacing is 15 kHz, one resource block includes seven symbols and 12 subcarriers. In this configuration, one resource block includes (7×12) resource elements.

In each LTE cell, one predetermined parameter is used for a certain subframe. The predetermined parameter is, for example, a parameter (physical parameter) related to a transmission signal. The parameter related to a transmission signal includes a CP length, subcarrier spacing, the number of symbols in one subframe (predetermined time length), the number of subcarriers in one resource block (predetermined frequency band), a multiple access method, signal waveform, or the like. In the LTE cell, link signals (downlink signal and uplink signal) are generated using one predetermined parameter in a predetermined time length (e.g., subframe).

[Frame Configuration in NR]

Figure 8:
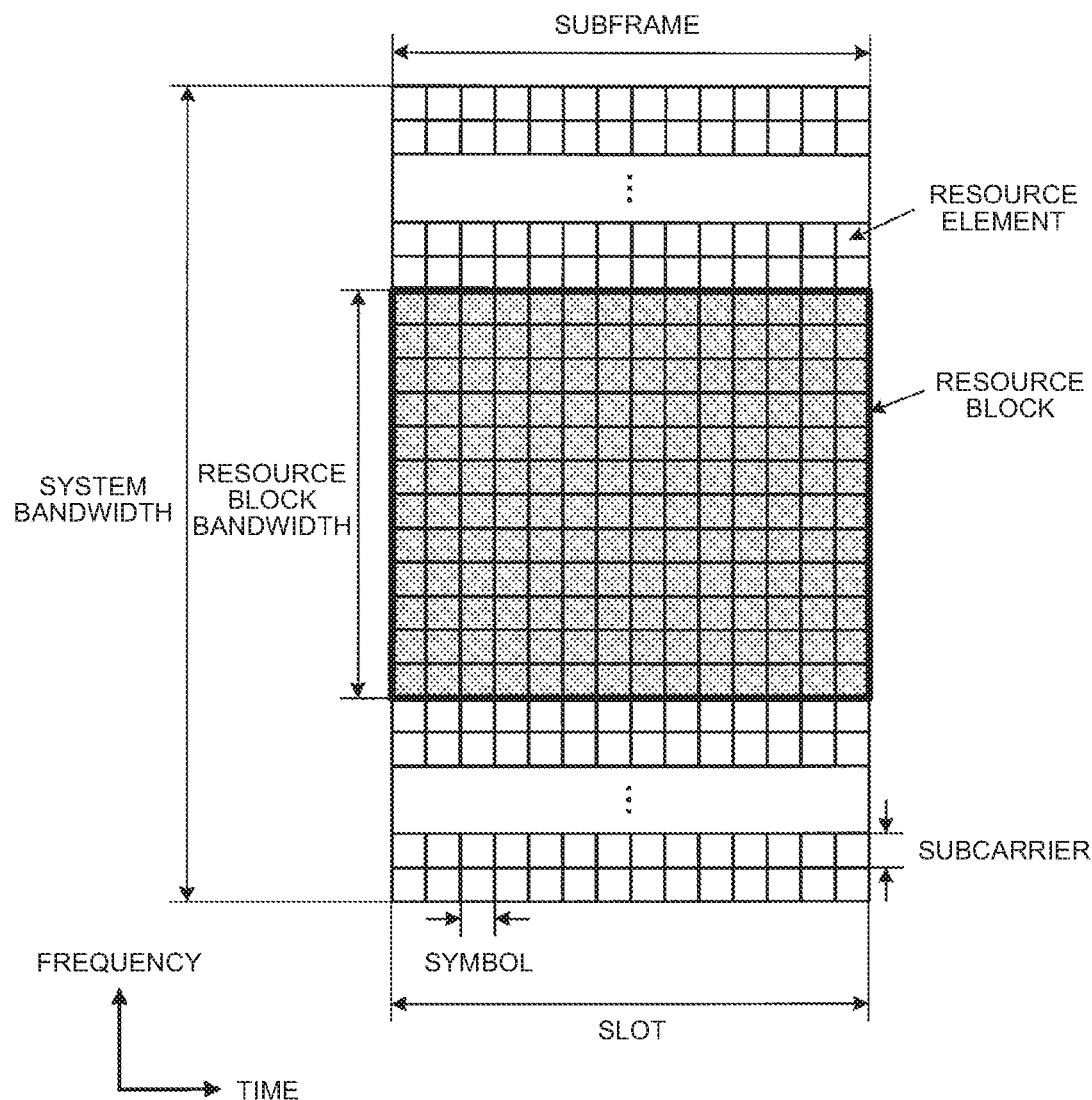
FIG. 8 is a diagram illustrating an example of a subframe configuration in NR.

FIG. 8 is a diagram illustrating an example of a subframe configuration in NR. In the example illustrated in FIG. 8, a system bandwidth represents an NR cell bandwidth. In an NR cell, one or more predetermined parameters are used in a predetermined time length (e.g., subframe). In other words, in the NR cell, link signals are generated using one or more predetermined parameters in a predetermined time length. When a plurality of predetermined parameters is used, signals generated by using the predetermined parameters are multiplexed by a predetermined method. For example, the predetermined method includes frequency division multiplexing (FDM), time division multiplexing (TDM), code division multiplexing (CDM), and/or spatial division multiplexing (SDM).

In combination of the predetermined parameters set in the NR cell, a plurality of kinds of parameter sets can be defined in advance. FIG. 9 is a diagram illustrating an example of the parameter sets related to transmission signals in the NR cell. In the example of FIG. 9, the parameters include "subcarrier spacing", "maximum bandwidth" of a component carrier, "CP length type", "the number of symbols" per subframe, and "the number of subcarriers" per resource block in the NR cell". One of the parameters may include "radio frame length." Note that "CP length type" is the type of CP length used for the NR cell. For example, CP length type 1 corresponds to the normal CP in LTE, and CP length type 2 corresponds to the extended CP in LTE. The parameter sets related to transmission signals in the NR cell can be defined individually for a downlink and an uplink. Furthermore, the parameter sets related to transmission signals in the NR cell can be set independently for the downlink and the uplink.

In the example of FIG. 9, as parameter set 0, 15 kHz (subcarrier spacing), 20 MHz (maximum bandwidth), type 1 (CP length type), 14 (the number of symbols), 1 ms (subframe length), 10 ms (radio frame length), and 12 (the number of subcarriers) are defined. Furthermore, as parameter set 1, 7.5 kHz (subcarrier spacing), 1.4 MHz (maximum bandwidth), type 1 (CP length type), 70 (the number of symbols), 10 ms (subframe length), 10 ms (radio frame length), 24 (the number of subcarriers) are defined. Still furthermore, as parameter set 2, 30 kHz (subcarrier spacing), 80 MHz (maximum bandwidth), type 1 (CP length type), 7 (the number of symbols), 0.25 ms (subframe length), 10 ms (radio frame length), 6 (the number of subcarriers) are defined. Still another furthermore, as parameter set 3, 15 kHz (subcarrier spacing), 20 MHz (maximum bandwidth), type 2 (CP length type), 12 (the number of symbols), 1 ms (subframe length), 10 ms (radio frame length), 12 (the number of subcarriers) are defined.

Figure 10:
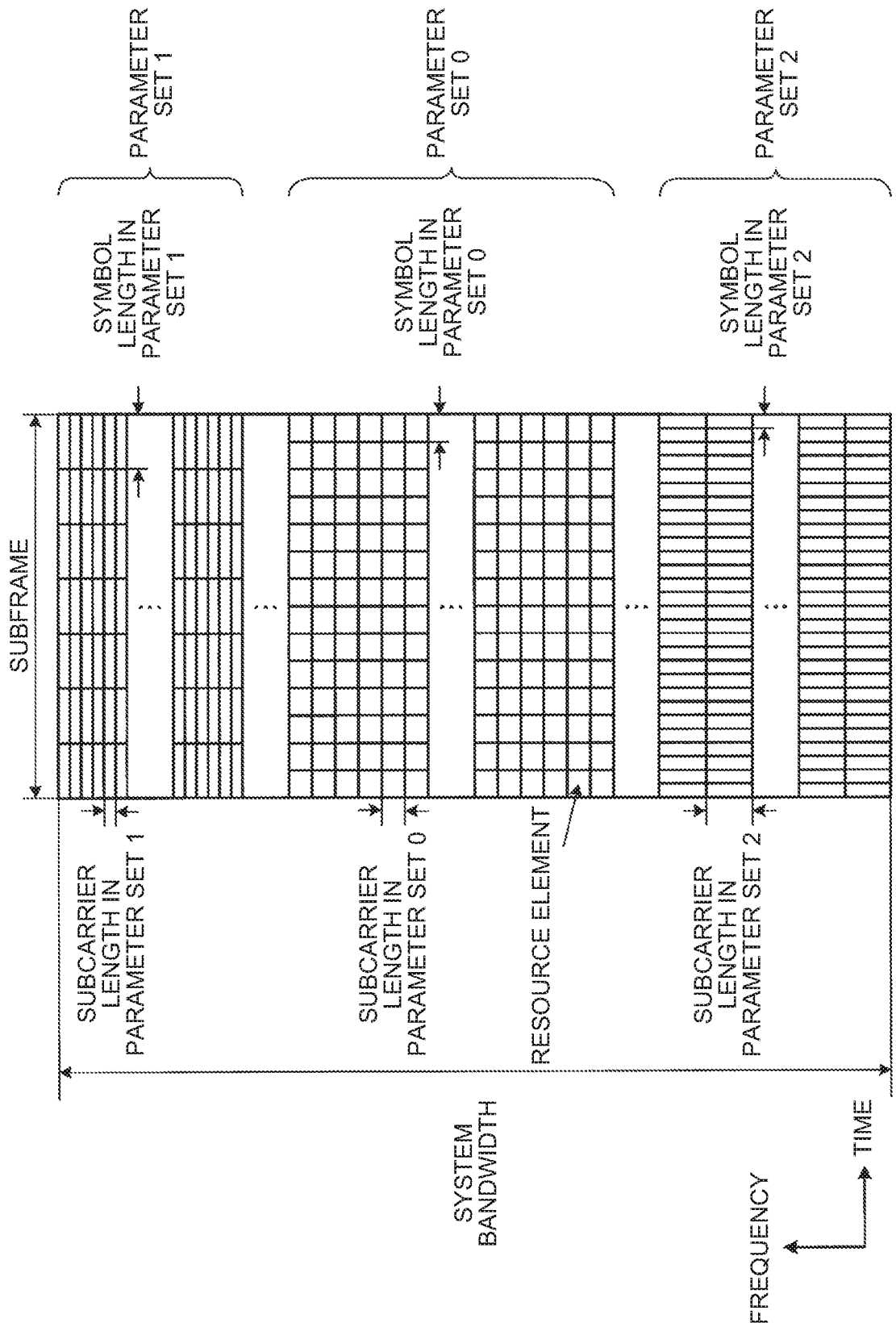
FIG. 10 is a diagram illustrating an example of a downlink subframe in NR.

FIG. 10 is a diagram illustrating an example of a downlink subframe in NR. In the example of FIG. 10, signals generated using the parameter set 1, parameter set 0, and parameter set 2 are frequency-division multiplexed (FDM) over a cell bandwidth (system bandwidth).

3. ABOUT NOMA

In orthogonal multiple access (OMA), for example, transmission and reception of data are performed using a frequency axis and a time axis that are orthogonal to each other. At this time, a frame configuration of a frequency-time resource is determined according to the subcarrier spacing, and it is not allowed to use the resource equal to or more than the number of resource elements. On the other hand, in orthogonal multiple access (NOMA), a non-orthogonal axis (e.g., interleave pattern axis, spreading pattern axis, scrambling pattern axis, codebook axis, power axis, or the like) is added to the frequency axis and time axis that are orthogonal to each other to determine the frame configuration.

<3-1. Transmitting and Receiving Data by Using NOMA>

Figure 11:
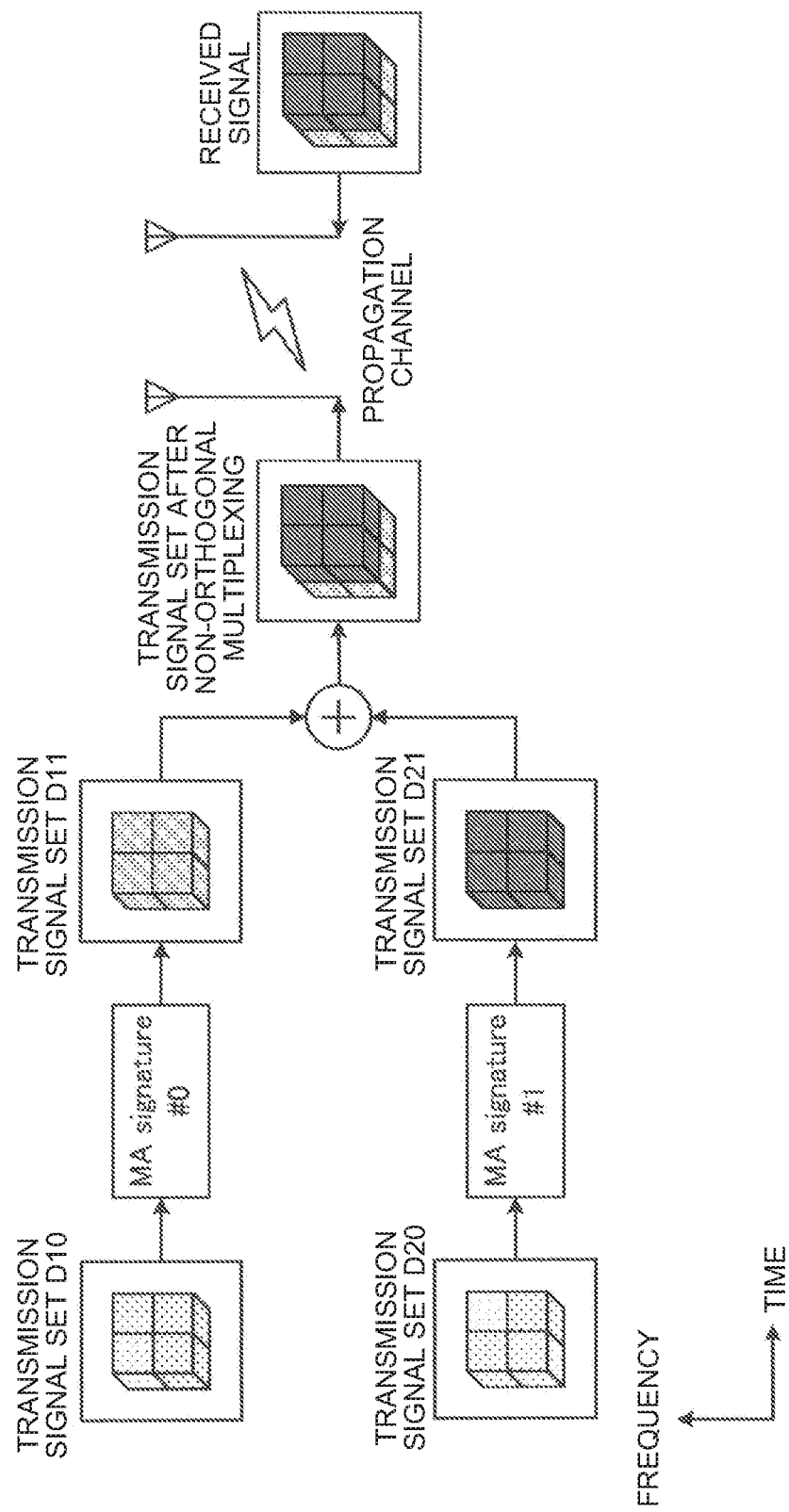
FIG. 11 is an explanatory diagram illustrating an example of a NOMA transmission process according to an embodiment of the present disclosure.

FIG. 11 is an explanatory diagram illustrating an example of a NOMA transmission process according to an embodiment of the present disclosure. The example of FIG. 11 illustrates how a transmission device multiplexes and transmits a transmission signal on non-orthogonal axes. In the example of FIG. 11, all resources multiplexed on the non-orthogonal axes have the same parameter set. Here, the transmission device is a communication device such as a base station device 20, a relay device 30, and a terminal device 40. In the example of FIG. 11, one transmission device (e.g., the terminal device $40_1$) multiplexes two transmission signal sets.

Note that the NOMA transmission process described below is achieved, for example, by controlling the transmission processing unit 412 by the control unit 45 (e.g., the processing unit 452 and the transmitting unit 455) of a terminal device 40. Alternatively, the following transmission processing is achieved, for example, by controlling the transmission processing unit 212 by the control unit 23 (e.g., the processing unit 232 and the transmitting unit 235) of a base station device 20.

A transmission signal set represents, for example, a signal that is generated by subjecting part or whole of transmission data generated in a communication device to signal processing for radio communication. In other words, the transmission signal set is transmission data (part or whole of the transmission data) that has been subjected to signal processing for radio communication. Here, the transmission data is data relating to a process that has generated in the communication device. For example, the transmission data is data related to a transmission job generated in various programs (e.g., application programs and operating system) performed by the communication device.

Note that in the present embodiment, the transmission data is divided into a plurality of pieces of data. In the following description, data serving as a transmission unit (division unit) of the transmission data is referred to as transmission unit data. Here, the transmission unit data may be one IP packet or one transport block. As a matter of course, the transmission unit data may be another transmission unit. The transport block is a unit of error correction such as hybrid automatic repeat request (hybrid ARQ (HARQ)). For example, the transport block is a block of data in a transport channel (transport layer). Note that the transmission signal set may be a signal (transmission unit data) generated by performing signal processing on transmission unit data such as a transport block. In the following description, the transmission signal set is assumed to be data obtained by performing signal processing for radio communication using OFDM on transmission unit data such as a transport block.

A transmission signal set (transmission unit data) may include a plurality of blocks or a plurality of elements. For example, it is assumed that the transmission signal set is a transport block. At this time, in the transmission signal set, the transmission unit data may include a plurality of resource blocks or resource elements. In the following example, a transmission signal set is assumed to include a plurality of blocks. In the example of FIG. 11, transmission signal sets D10 and D20 each include four blocks (e.g., resource blocks).

In the example of FIG. 11, the transmission device applies a corresponding multiple access signature (MA signature) to each of the transmission signal sets D10 and D20. The MA signature is one piece of information relating to non-orthogonal multiplexing. For example, the MA signature includes an interleave pattern, spreading pattern, scrambling pattern, codebook, power allocation, or the like. Note that the MA signature may be simply referred to as pattern or index. For example, the MA signature may be an identifier that indicates a pattern or index used in NOMA transmission as described above or may represent the pattern itself. In the following description, applying an MA signature to a predetermined transmission signal set may be referred to as a NOMA transmission process using an MA signature. An example of the NOMA transmission process using an MA signature includes a process of converting a predetermined transmission signal set mapped on a predetermined orthogonal resource into a transmission signal set that is transmittable using a non-orthogonal resource indicated by the MA signature.

In the example of FIG. 11, the transmission device (e.g., the processing unit 452 of the terminal device $40_1$) performs the NOMA transmission process using an MA signature #0 for the transmission signal set D10 and performs the NOMA transmission process using an MA signature #1 for the transmission signal set D20. The MA signature #0 and MA signature #1 are corresponding non-orthogonal resources. For example, it is assumed that an MA signature represents power allocation (i.e., a non-orthogonal axis is a power axis). At this time, the MA signature #0 may be information indicating that a predetermined transmission signal set is converted into a transmission signal set with small power (e.g., power equal to or lower than a first threshold value). Furthermore, the MA signature #1 may be information indicating conversion of a predetermined transmission signal set into a transmission signal set with large power (e.g., power of equal to or more than a second threshold value larger than the first threshold value).

The transmission device multiplexes signals obtained after application of the MA signatures, on the same frequency-time resource. For example, the transmission device non-orthogonally multiplexes transmission signal sets D11 and D21 that are generated as a result of the NOMA transmission process, on the same orthogonal resource. Then, the transmission device (e.g., the transmitting unit 455 of the terminal device $40_1$) transmits a transmission signal obtained after non-orthogonal multiplexing to an antenna port.

Note that in the example of FIG. 11, the transmission device multiplexes two transmission signal sets. However, the transmission device may multiplex three or more transmission signal sets. Furthermore, the respective transmission signal sets may be transmission signals to separate reception devices or transmission signals to the same reception device. Here, the reception device is a communication device such as a base station device 20, a relay device 30, and a terminal device 40.

Figure 12:
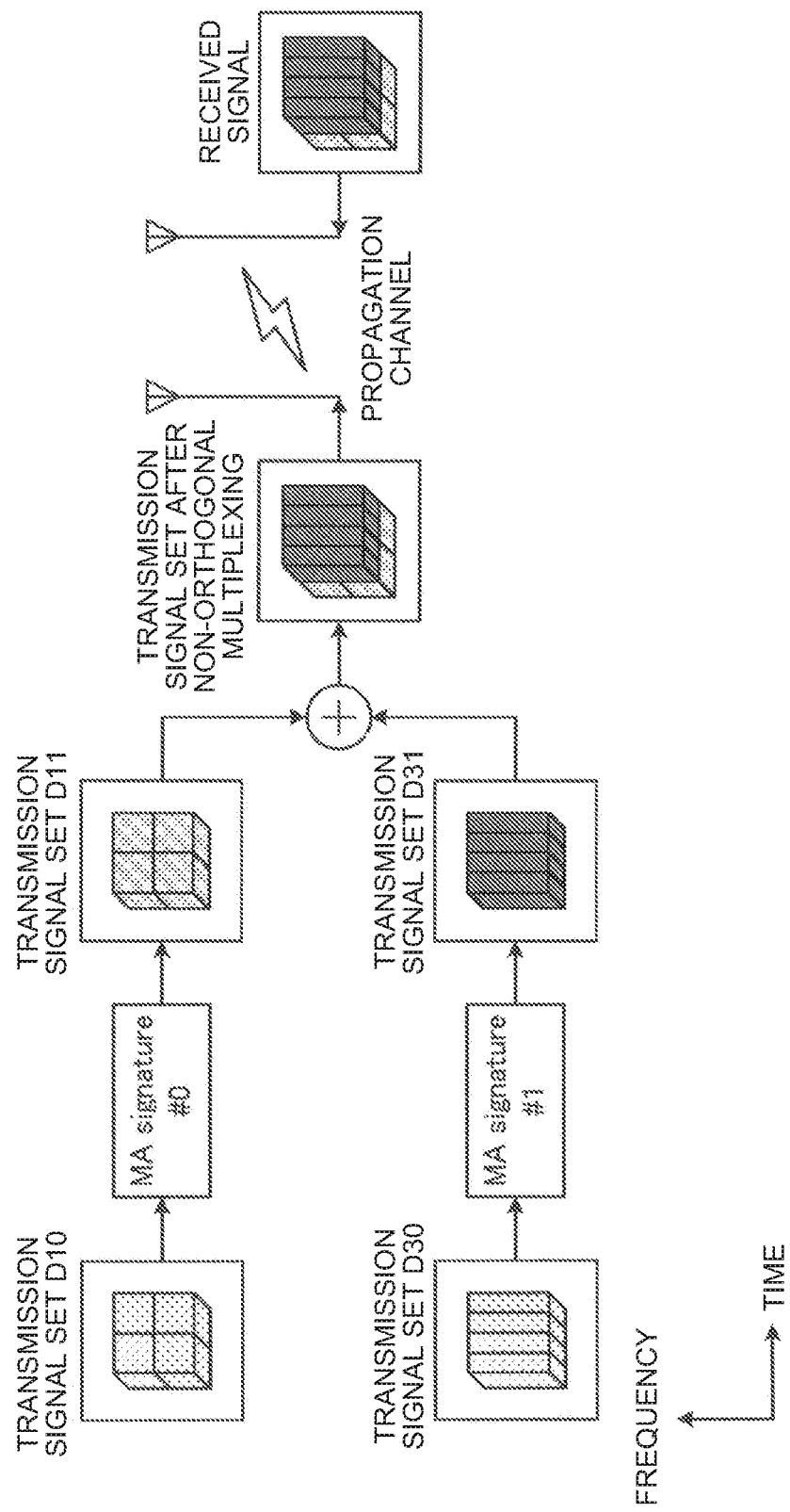
FIG. 12 is an explanatory diagram illustrating an example of a NOMA transmission process according to an embodiment of the present disclosure.

Furthermore, in the example of FIG. 11, the transmission device multiplexes the transmission signal sets having the same parameter set. However, the transmission device may multiplex transmission signal sets having different parameter sets. FIG. 12 is an explanatory diagram illustrating an example of a NOMA transmission process according to an embodiment of the present disclosure. In the example of FIG. 12, two transmission signal sets having different parameter sets are multiplexed. Specifically, in the example of FIG. 12, a transmission device (e.g., the processing unit 452 of the terminal device $40_1$) performs a NOMA transmission process using MA signatures (MA signatures #0 and #1) respectively corresponding to transmission signal sets D10 and D30. The transmission signal sets D30 and D40 are transmission signal sets having different parameter sets. Then, the transmission device non-orthogonally multiplexes transmission signal sets D11 and D31 that are generated as a result of the NOMA transmission process, on the same orthogonal resource. Then, the transmission device (e.g., the transmitting unit 455 of the terminal device $40_1$) transmits a transmission signal obtained after non-orthogonal multiplexing to an antenna port.

Figure 13:
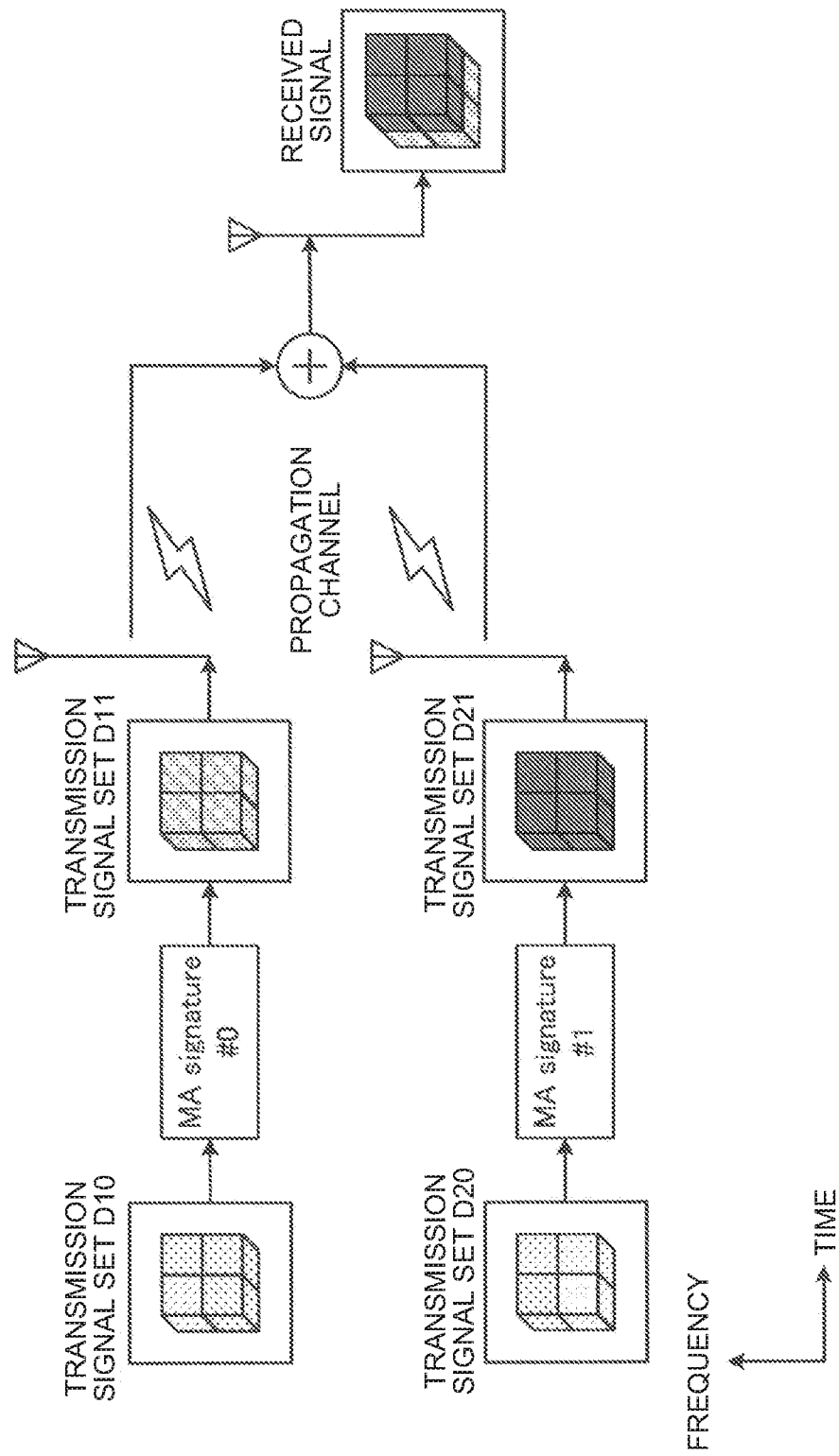
FIG. 13 is an explanatory diagram illustrating an example of a NOMA transmission process according to an embodiment of the present disclosure.

Note that in each of the examples of FIGS. 11 and 12, a plurality of transmission signal sets is non-orthogonally multiplexed in the transmission device. However, a plurality of transmission signal sets may be non-orthogonally multiplexed on a propagation channel. FIG. 13 is an explanatory diagram illustrating an example of a NOMA transmission process according to an embodiment of the present disclosure. In the example of FIG. 13, two transmission signal sets are transmitted from different antennas. The plurality of transmission signal sets may be transmitted from separate transmission devices (e.g., the terminal devices $40_1$ and $40_2$) or may be transmitted from different antennas of one transmission device (e.g., the terminal device $40_1$). In the following description, it is assumed that the two transmission signal sets are transmitted from separate transmission devices, but, as a matter of course, the two transmission signal sets may be transmitted from one transmission device.

In the example of FIG. 13, one transmission device (e.g., the terminal device $40_1$) performs a NOMA transmission process using an MA signature #0 for a transmission signal set D10. Furthermore, the other transmission device (e.g., the terminal device $40_2$) performs a NOMA transmission process using an MA signature #1 for a transmission signal set D20. The MA signature #0 and MA signature #1 are corresponding non-orthogonal resources. For example, the MA signature includes an interleave pattern, spreading pattern, scrambling pattern, codebook, power allocation, repetition, or the like. Transmission signal sets D11 and D21 obtained after application of the MA signatures are transmitted on the same frequency-time resource, and are multiplexed through a propagation channel.

Figure 14:
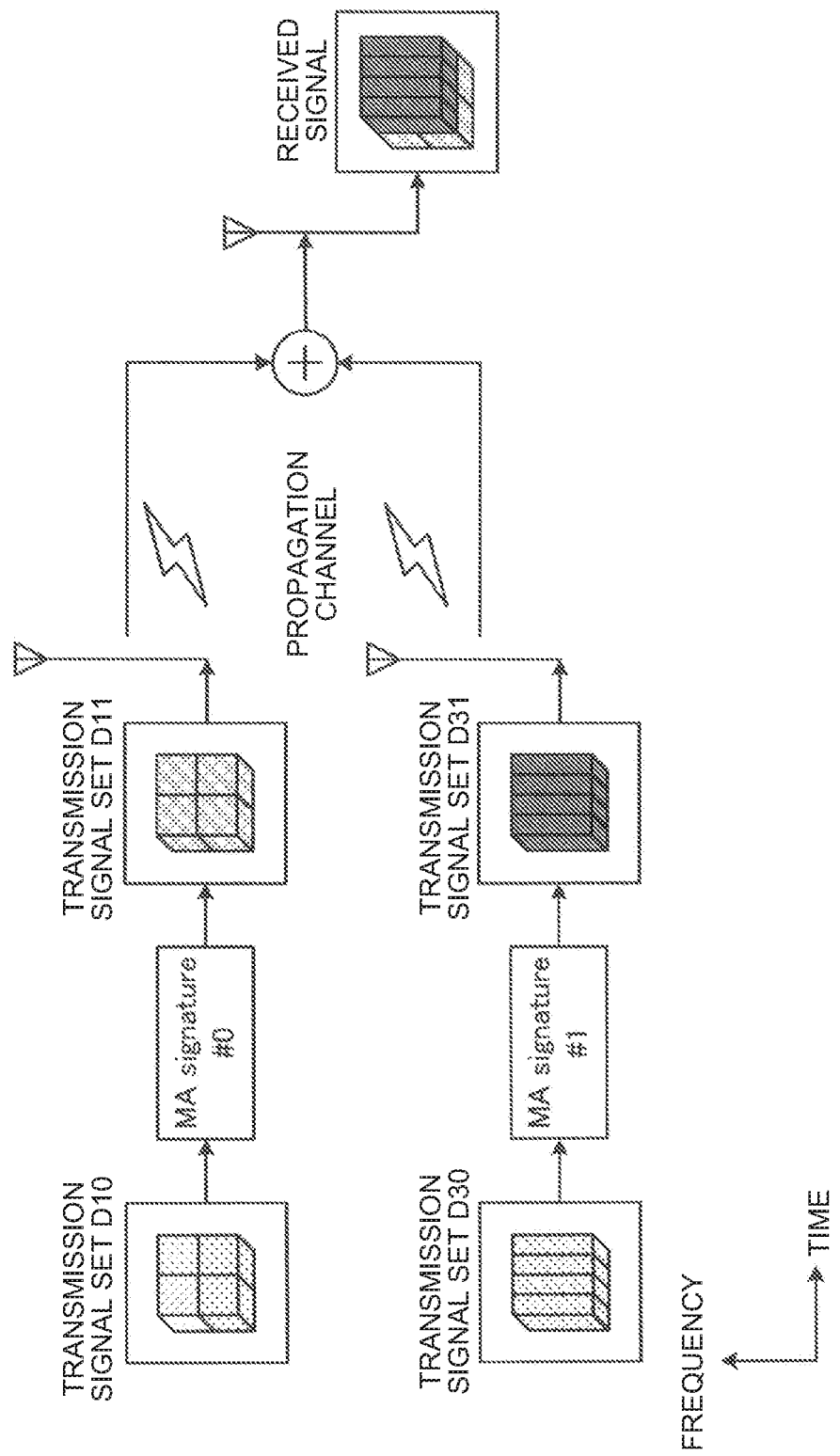
FIG. 14 is an explanatory diagram illustrating an example of a NOMA transmission process according to an embodiment of the present disclosure.

Furthermore, in the example of FIG. 13, the transmission signal sets having the same parameter set are multiplexed. However, transmission signal sets to be multiplexed may be transmission signal sets having different parameter sets. FIG. 14 is an explanatory diagram illustrating an example of a NOMA transmission process according to an embodiment of the present disclosure. In the example of FIG. 14, two transmission signal sets having different parameter sets are multiplexed. Specifically, in the example of FIG. 14, one transmission device (e.g., the terminal device $40_1$) performs a NOMA transmission process using an MA signature #0 for a transmission signal set D10. The other transmission device (e.g., the terminal device $40_2$) performs a NOMA transmission process using an MA signature #1 for a transmission signal set D30. The transmission signal sets D10 and D30 are transmission signal sets having different parameter sets. Furthermore, the MA signature #0 and the MA signature #1 are corresponding non-orthogonal resources. Transmission signal sets D11 and D31 obtained after application of the MA signatures are transmitted on the same frequency-time resource, and are multiplexed through a propagation channel.

Figure 15:
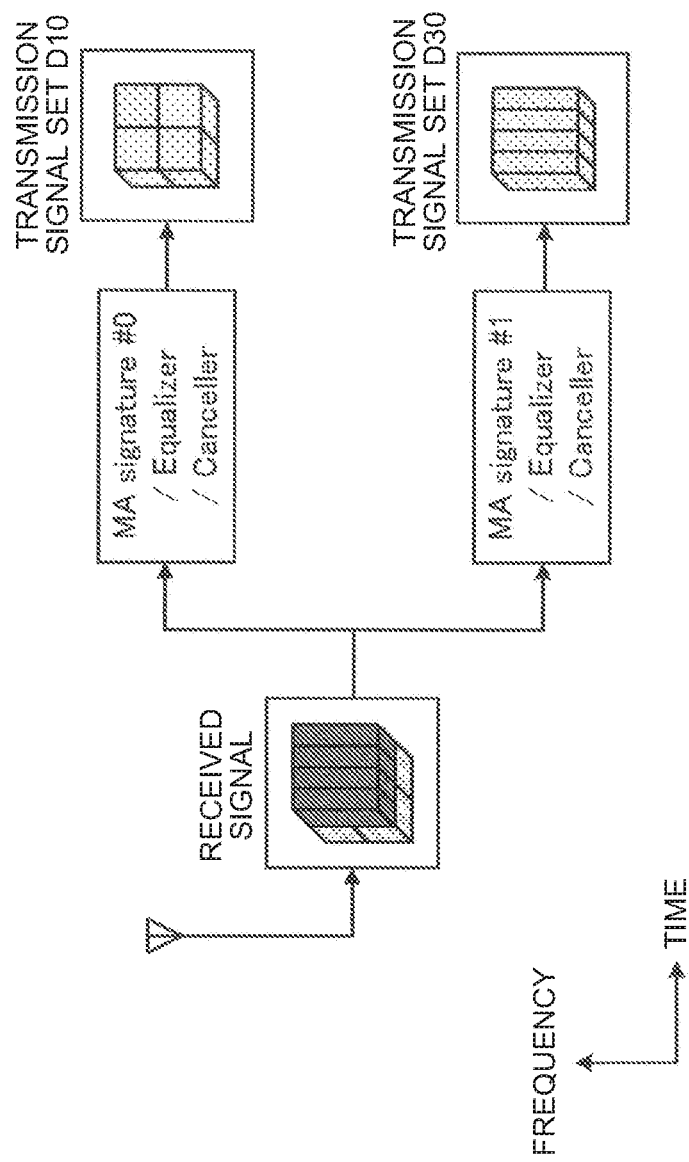
FIG. 15 is an explanatory diagram illustrating an example of a NOMA reception process according to an embodiment of the present disclosure.

FIG. 15 is an explanatory diagram illustrating an example of a NOMA reception process according to an embodiment of the present disclosure. Note that the NOMA reception process described below is achieved by controlling the reception processing unit 211 by the control unit 23 (e.g., the reception unit 233 and the separation unit 234) of a base station device 20. Alternatively, the NOMA reception process described below is achieved, for example, by controlling the reception processing unit 411 by the control unit 45 (e.g., the reception unit 453 and the separation unit 454) of a terminal device 40.

As illustrated in FIG. 15, a received signal is received in a state where a plurality of transmission signals is multiplexed on the same frequency-time resource. In order to decode multiplexed transmission signal sets, a reception device (e.g., the separation unit 234 of the base station device $20_1$) performs a NOMA reception process (e.g., channel equalization and processing of an interference signal canceller or the like), on the basis of MA signatures used in the transmission device. Therefore, the reception device extracts a desired signal from the received signal. In the example of FIG. 15, the reception device performs a NOMA reception process using an MA signature #0 and an MA signature #1 for the received signal and extracts the transmission signal sets D10 and D30. Note that when the same MA signature is used for multiplexing, influence of interference between the multiplexed signals will be large, and it is difficult to perform decoding. Therefore, the base station device 20 schedules the MA signatures used by a terminal device 40 or the like to avoid overlapping of the MA signatures.

As described above, in the NOMA transmission, it is necessary to share, between a transmission device and a reception device, MA signatures having been applied to the transmission device and the reception device and to apply the MA signatures without overlapping. Note that in the following description, MA signatures are also included in the concept of resource (radio resource). Here, a resource including all of the frequency, time, and MA signatures may be referred to as a multiple access resource (MA resource). Furthermore, a resource including only frequency and time may be referred to as a multiple access physical resource (MA physical resource).

<3-2. Efficient Use of MA Resource>

In the examples of FIGS. 11 to 15, the same MA signature is applied to one transmission signal set (e.g., one piece of transmission unit data). However, in this case, the communication system 1 may not be able to use the MA resource efficiently.

Figure 16:
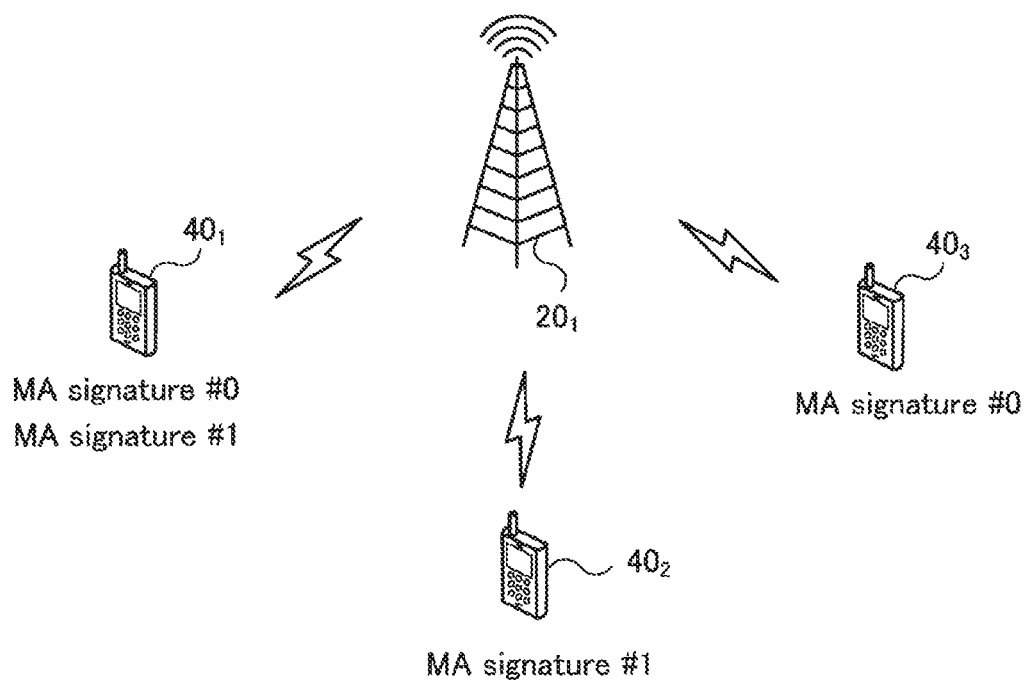
FIG. 16 is a diagram illustrating radio connection between a base station device and three terminal devices.

FIG. 16 is a diagram illustrating radio connection between the base station device $20_1$ and the three terminal devices $40_1$, $40_2$, and $40_3$. In the example of FIG. 16, the terminal devices $40_1$, $40_2$, and $40_3$ function as transmission devices, and the base station device $20_1$ functions as a reception device. In the example of FIG. 16, the terminal devices $40_1$, $40_2$, and $40_3$ have restricted available MA signatures. In the example of FIG. 16, the terminal device $40_1$ is configured to transmit data by using both of a MA signature #0 and a MA signature #1. Furthermore, the terminal device $40_2$ is configured not to use the MA signature #0 but to use only the MA signature #1 to transmit data. Still furthermore, the terminal device $40_3$ is configured not to use the MA signature #1 but to use only the MA signature #0 to transmit data.

Note that the terminal devices $40_2$ and $40_3$ illustrated in FIG. 16 may not necessarily be terminals configured to perform the NOMA transmission process. For example, the terminal devices $40_2$ and $40_3$ may be terminals (OMA terminals) configured to perform only orthogonal multiple access (OMA), which can be considered as terminals equivalent to terminals configured to perform only data transmission using the MA signature #0 or MA signature #1.

Figure 17:
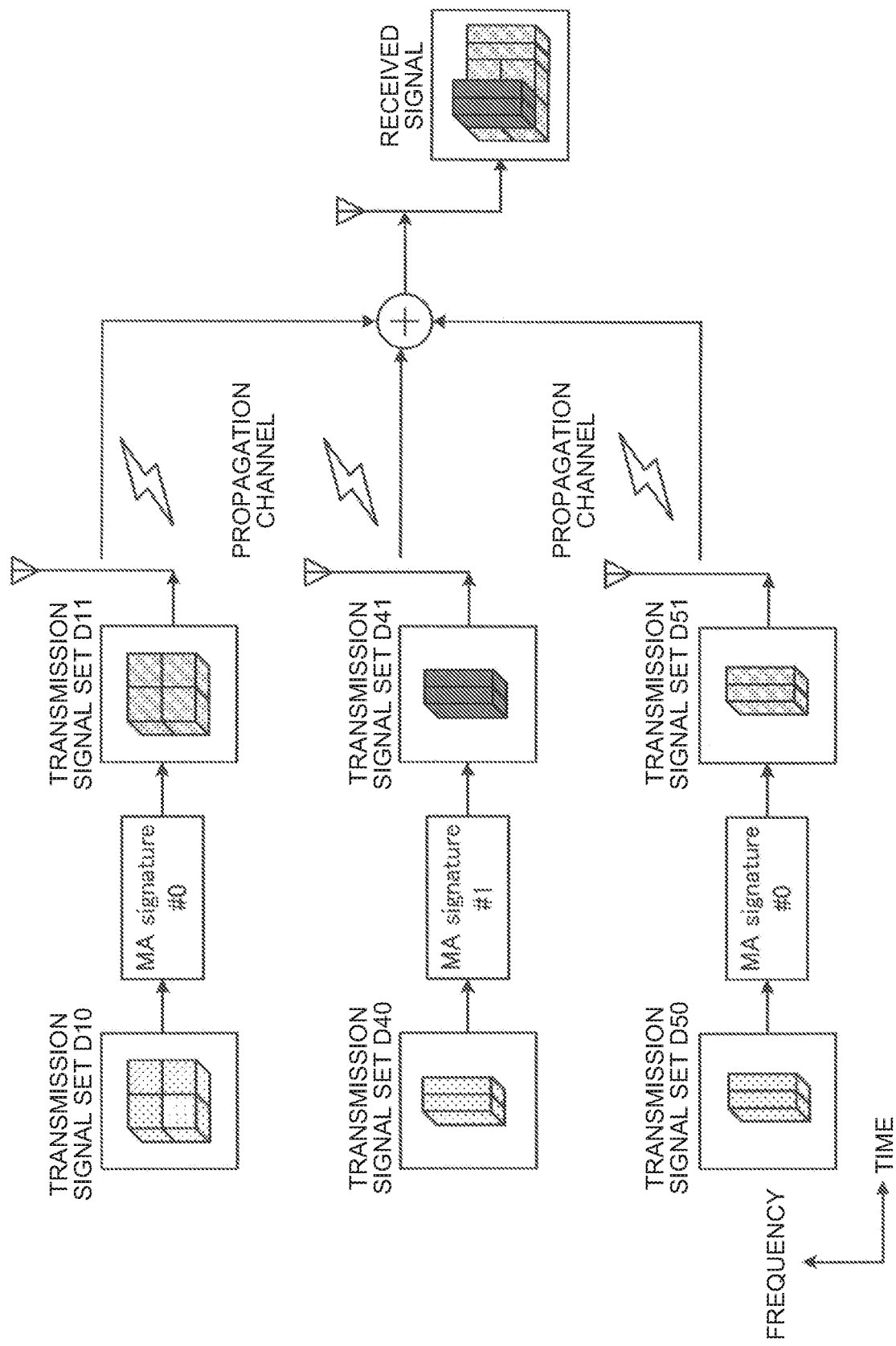
FIG. 17 is an explanatory diagram illustrating an example of a NOMA transmission process according to an embodiment of the present disclosure.

Here, it is assumed that the terminal device $40_1$ acquires transmission unit data of four blocks and the terminal devices $40_2$ and $40_3$ each acquire transmission unit data of two blocks. FIG. 17 is an explanatory diagram illustrating an example of a NOMA transmission process according to an embodiment of the present disclosure. In the example of FIG. 17, a transmission signal set D10 is obtained by performing signal processing on transmission unit data acquired by the terminal device $40_1$ into a signal transmittable by using the MA physical resource. Furthermore, a transmission signal set D40 is obtained by performing signal processing on transmission unit data acquired by the terminal device $40_2$ into a signal transmittable by using the MA physical resource. Furthermore, a transmission signal set D50 is obtained by performing signal processing on transmission unit data acquired by the terminal device $40_2$ into a signal transmittable by using the MA physical resource.

In the example of FIG. 17, the terminal device $40_1$ (e.g., the processing unit 452 of the terminal device $40_1$) applies an MA signature #0 to the transmission signal set D10 to generate a transmission signal set D11. Furthermore, the terminal device $40_2$ applies an MA signature #1 to the transmission signal set D40 to generate a transmission signal set D41. Furthermore, the terminal device $40_3$ applies the MA signature #0 to the transmission signal set D50 to generate a transmission signal set D51. Here, the MA signature #0 and the MA signature #1 represent corresponding non-orthogonal resources.

At this time, the NOMA transmission process using corresponding MA signatures has been performed on the transmission signal sets D11 and D41, and the transmission signal sets D11 and D41 can be non-orthogonally multiplexed on the same MA physical resource. However, the NOMA transmission process using the corresponding MA signatures is not performed on the transmission signal sets D11 and D51, and the transmission signal sets D11 and D51 cannot be non-orthogonally multiplexed on the same MA physical resource. Therefore, the base station device $20_1$ has no choice but to allocate the transmission signal set D11 and the transmission signal set D51 onto different MA physical resources (on the frequency axis and time axis). Thus, the base station device $20_1$ has no choice but to secure many MA physical resources so that the three terminal devices $40_1$, $40_2$, and $40_3$ transmit data. In the example of FIG. 17, the base station device $20_1$ has no choice but to secure the MA physical resource of six blocks. Thus, the communication system 1 cannot efficiently use the resource as a whole.

Therefore, the present embodiment enables the NOMA transmission process for a partial range of transmission data (or transmission unit data). At this time, the NOMA transmission process may or may not be performed for the other range of the transmission data (or transmission unit data). For example, a transmission device divides one piece of transmission unit data into a plurality of NOMA application ranges (NOMA application units) and performs the NOMA transmission process using a predetermined MA signature on each of the plurality of NOMA application ranges. The NOMA application range is a range (unit) to which one MA signature is applied. The NOMA application range can be also referred to as NOMA application unit.

Figure 18:
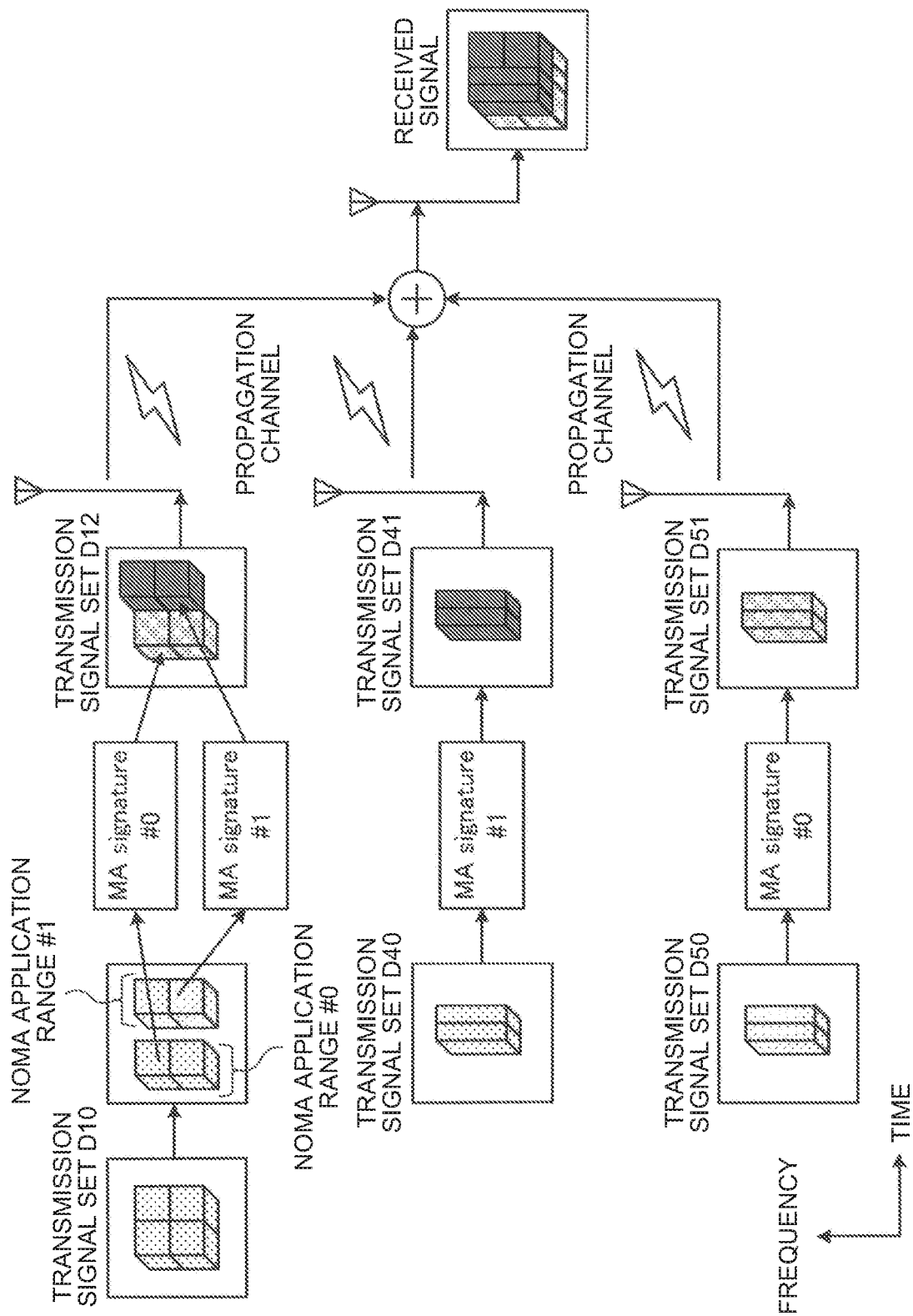
FIG. 18 is an explanatory diagram illustrating an example of a NOMA transmission process according to an embodiment of the present disclosure.

FIG. 18 is an explanatory diagram illustrating an example of a NOMA transmission process according to an embodiment of the present disclosure. The NOMA transmission process described below is achieved, for example, by controlling the transmission processing unit 412 by the control unit 45 (e.g., the processing unit 452 and the transmitting unit 455) of a terminal device 40, as in the NOMA transmission processes of FIGS. 11 to 14. Note that when the transmission device is a base station device 20, the following transmission processing may be achieved, for example, by controlling the transmission processing unit 212 by the control unit 23 (e.g., the processing unit 232 and the transmitting unit 235) of the base station device 20.

In the example of FIG. 18, the terminal device $40_1$ divides a transmission signal set D10 of four blocks into sets of two blocks in the time direction. In the example of FIG. 18, the first two blocks are a NOMA application range #0 and the latter two blocks are a NOMA application range #1. Then, the terminal device $40_1$ performs a NOMA transmission process using an MA signature #0 on the NOMA application range #0 and a NOMA transmission process using an MA signature #1 on the NOMA application range #1. Thus, a transmission signal set D12 is generated.

The MA signature #0 is applied to the portion of the NOMA application range #0 of the transmission signal set D12, and the portion can be non-orthogonally multiplexed with a transmission signal set D41 generated by applying the MA signature #1. Furthermore, the MA signature #1 is applied to the portion of the NOMA application range #1 of the transmission signal set D12, and thus, the portion can be non-orthogonally multiplexed with a transmission signal set D51 generated by applying the MA signature #0. Therefore, the base station device $20_1$ only needs to secure the MA physical resource of four blocks, for transmission of data by each of the three terminal devices $40_1$, $40_2$, and $40_3$.

Figure 19:
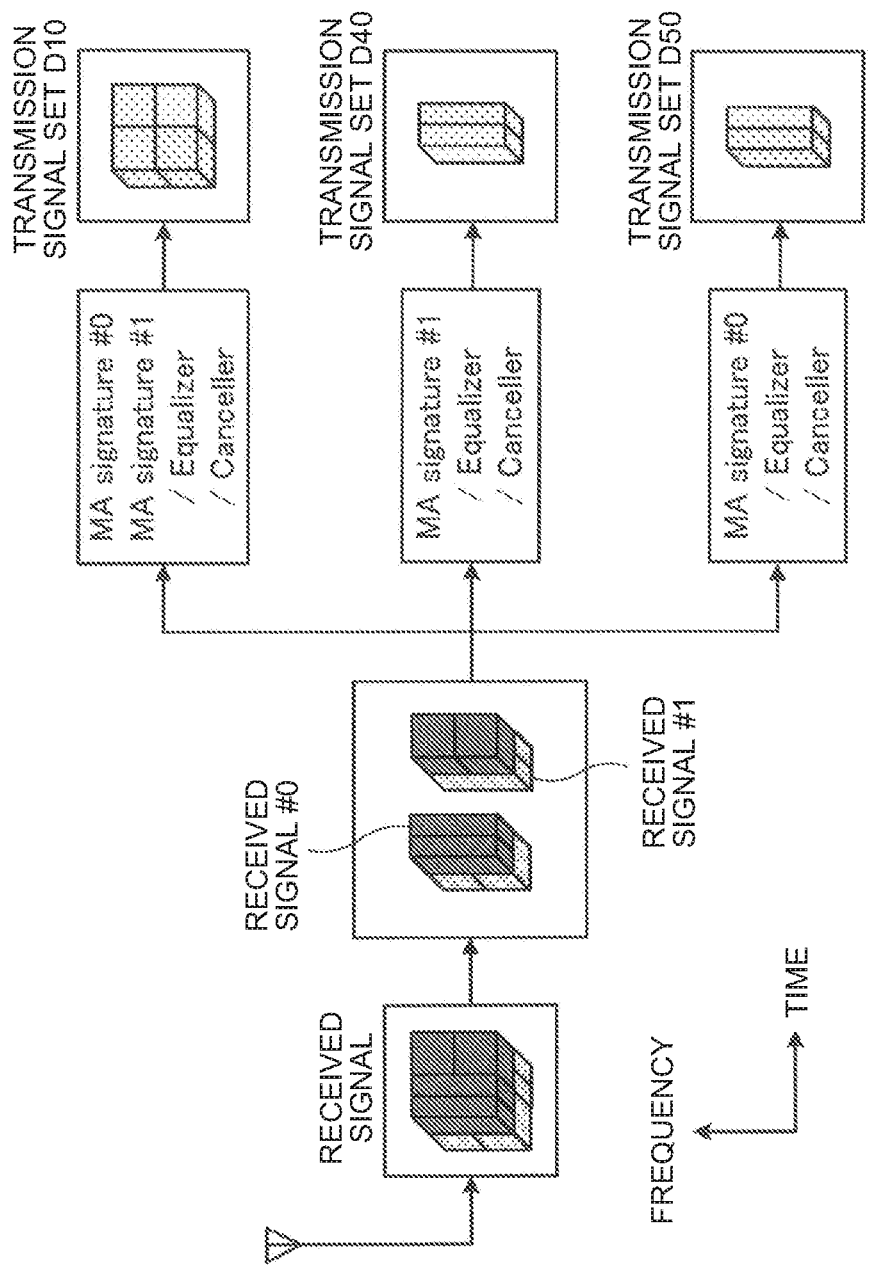
FIG. 19 is an explanatory diagram illustrating an example of a NOMA reception process according to an embodiment of the present disclosure.

FIG. 19 is an explanatory diagram illustrating an example of a NOMA reception process according to an embodiment of the present disclosure. Note that the NOMA reception process described below is achieved by controlling the reception processing unit 211 by the control unit 23 (e.g., the reception unit 233 and the separation unit 234) of a base station device 20, as in the NOMA reception process illustrated in FIG. 15. Alternatively, the NOMA reception process described below is achieved, for example, by controlling the reception processing unit 411 by the control unit 45 (e.g., the reception unit 453 and the separation unit 454) of a terminal device 40.

As illustrated in FIG. 19, the base station device $20_1$ (e.g., the reception unit 233 of the base station device $20_1$) receives a received signal in which a plurality of transmission signals is multiplexed on the same frequency-time resource. In order to decode multiplexed transmission signal sets, the base station device $20_1$ (e.g., the separation unit 454 of the base station device $20_1$) performs a NOMA reception process, on the basis of MA signatures used in the transmission device.

For example, the base station device $20_1$ divides the received signal according to the division used for a NOMA transmission process by the terminal device $40_1$. For example, the base station device $20_1$ divides the received signal into sets of two blocks in the time direction. Hereinafter, the first two blocks will be referred to as a received signal #0, and the latter two blocks will be referred to as a received signal #1. Then, the base station device $20_1$ performs a NOMA reception process using a MA signature #0 for the received signal #0 and a NOMA reception process using a MA signature #1 for the received signal #1. Thereby the base station device $20_1$ extracts a transmission signal set D10 from the received signal. Furthermore, the base station device $20_1$ performs a NOMA reception process using the MA signature #1 for the received signal #0. Thereby, the base station device $20_1$ extracts a transmission signal set D40 from the received signal. Furthermore, the base station device $20_1$ performs a NOMA reception process using the MA signature #0 for the received signal #1. Thereby, the base station device $20_1$ extracts a transmission signal set D50 from the received signal.

For example, in the examples of FIGS. 18 and 19, the transmission unit data includes four blocks, but the transmission unit data may include more than four blocks, or may include less than four blocks.

As described above, a transmission device divides one piece of transmission unit data into a plurality of NOMA application ranges and performs a NOMA transmission process using a predetermined MA signature on each of the plurality of NOMA application ranges. This enables the communication system 1 to flexibly allocate the MA resource to each transmission device according to the state of each transmission device. Therefore, the communication system 1 is configured to efficiently use the resource as a whole.

<3-3. Specific Examples of NOMA Application Range>

Note that the division of transmission unit data is not limited to the example illustrated in FIG. 19. The communication system 1 is configured to adopt various division patterns to divide transmission unit data (e.g., transport block). The division patterns are a division pattern used to divide the transmission unit data (or transmission data) into a plurality of NOMA application ranges.

In the following description, it is assumed that a transmission device is a terminal device 40 and a reception device is a base station device 20, but the transmission device and the reception device are not limited to this example. For example, the transmission device may be a base station device 20 or a relay device 30. Furthermore, the reception device may be a relay device 30 or a terminal device 40. The following processing is executed, for example, by the processing unit 452 of a terminal device 40. If the transmission device is a base station device 20, the following processing may be performed by the processing unit 232 of a base station device 20.

[Example of Division of Transmission Unit Data]

In the description of FIG. 19, the terminal device 40 divides the transmission unit data into two NOMA application ranges (NOMA application units), but the number of the NOMA application range included in one piece of transmission unit data is not limited to two. The terminal device 40 may divide the transmission unit data into more than two NOMA application ranges. Furthermore, the transmission unit data may be divided in the frequency direction or the time direction.

Figure 20:
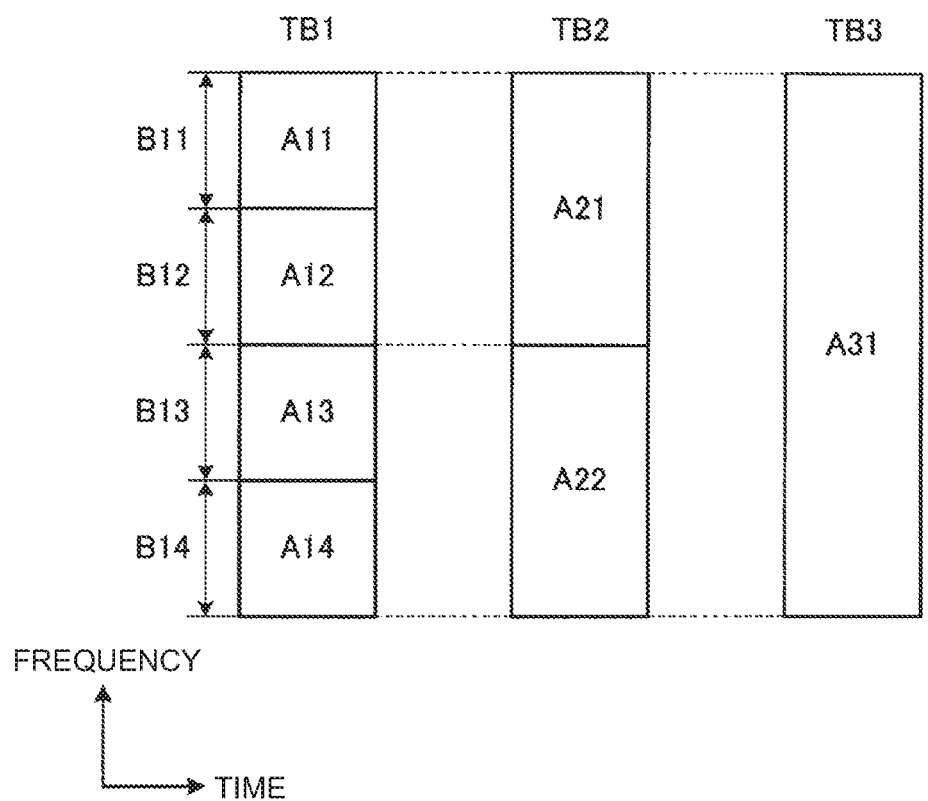
FIG. 20 is a diagram illustrating a specific example of division patterns.

FIG. 20 is a diagram illustrating a specific example of division patterns. In the example of FIG. 20, transmission unit data is a transport block. In FIG. 20, three transport blocks of transport blocks TB1, TB2, and TB3 are illustrated that are arranged on an MA physical resource. The terminal device 40 divides the transport block TB1 into four NOMA application ranges A11, A12, A13, and A14 in the frequency direction. Furthermore, the terminal device 40 divides the transport block TB2 into two NOMA application ranges A21 and A22 in the frequency direction. The terminal device 40 does not necessarily need to divide the transmission unit data into a plurality of NOMA application ranges. One piece of transmission unit data may be set as one NOMA application range without any change. In the example of FIG. 20, the terminal device 40 sets the transport block TB3 as one NOMA application range A31.

Figure 21:
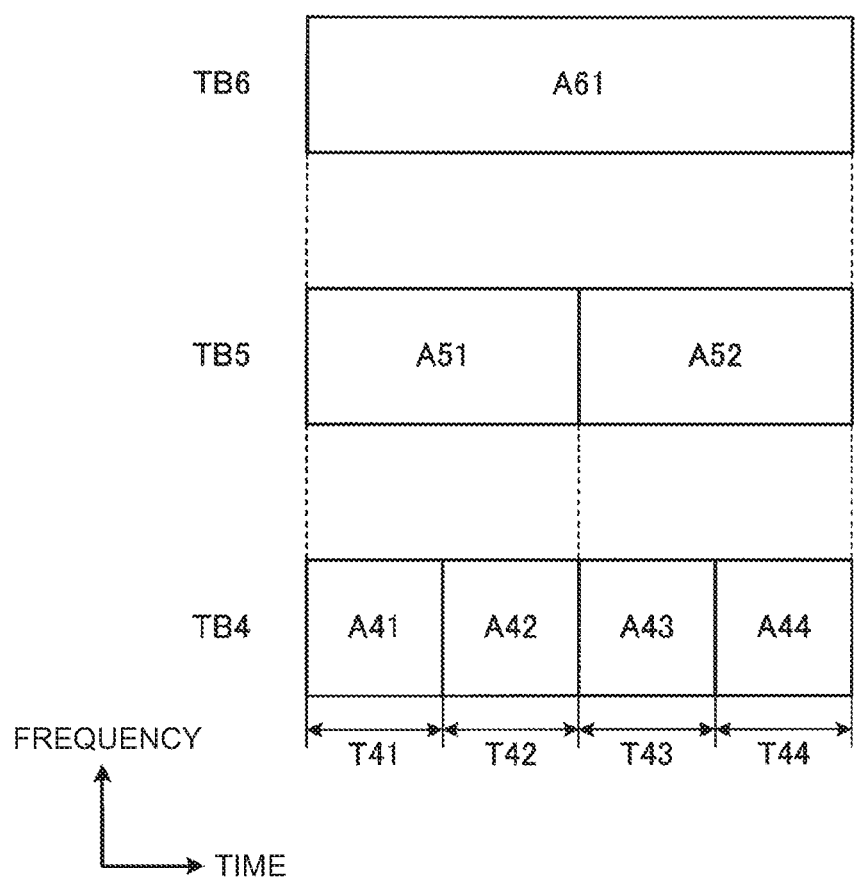
FIG. 21 is a diagram illustrating a specific example of division patterns.

Furthermore, a division direction of the transmission unit data is not limited to the frequency direction. FIG. 21 is a diagram illustrating a specific example of division patterns. In FIG. 21, three transport blocks TB4, TB5, and TB6 are illustrated that are arranged on an MA physical resource. The terminal device 40 divides the transport block TB4 into four NOMA application ranges A41, A42, A43, and A44 in the time direction. Furthermore, the terminal device 40 divides the transport block TB5 into two NOMA application ranges A51 and A52 in the time direction. Note that the terminal device 40 may set the transport block TB6 as one NOMA application range A61 without any change.

Note that the terminal device 40 does not necessarily need to set the same division pattern to all transmission unit data. The terminal device 40 may switch division patterns according to a predetermined criterion. For example, the terminal device 40 divides a certain transport block into four NOMA application ranges as shown in the transport TB4 of FIG. 21. Furthermore, the terminal device 40 divides another transport block into two NOMA application ranges as shown in the transport TB5 of FIG. 21. At this time, the terminal device 40 may switch the division patterns for the respective transmission unit data or may switch the division patterns at fixed time intervals. As a matter of course, the terminal device 40 may switch the division patterns according to another criterion.

Furthermore, a NOMA application range can vary in size. For example, the NOMA application range may have a size as indicated in the following (A1) to (A3). As a matter of course, the size of the NOMA application range is not limited to the following (A1) to (A3).

(A1) 1 resource block
(A2) 1 subcarrier×1 slot
(A3) 12 subcarriers×1 symbol

A plurality of NOMA application ranges included in one piece of transmission unit data may or may not all have the same size. For example, in the example of FIG. 20, bandwidths B11, B12, B13, and B14 may have the same size. For example, the bandwidths B11, B12, B13, and B14 may each have a bandwidth of one resource block. Furthermore, some or all of the bandwidths B11, B12, B13, and B14 may have different bandwidths. Furthermore, in the example of FIG. 21, times T41, T42, T43, and T44 may have the same size. For example, the times T41, T42, T43, and T44 may each have a time of one resource block (e.g., 14 symbols). Furthermore, some or all of the times T41, T42, T43, and T44 may have different bandwidths. For example, the NOMA application ranges A41 and A43 may have three symbols, and the NOMA application ranges A42 and A44 may have four symbols.

[MA Signature Applied to NOMA Application Range]

NOMA transmission processes performed on a plurality of NOMA application ranges included in one piece of transmission unit data may have the same process content or different process contents. In other words, MA signatures applied to the plurality of NOMA application ranges may be the same or different.

For example, in the transport block TB4 of FIG. 21, MA signatures, for example, as indicated in the following (B1) to (B4) may be applied to the respective NOMA application ranges. As a matter of course, the MA signatures are not limited to the following (B1) to (B4).

(B1) Interleaving is applied to the NOMA application range A41, a spreading code is applied to the NOMA application range A42, and scrambling is applied to the NOMA application range A42.

(B2) A first interleave pattern is applied to the NOMA application range A41, and a second interleave pattern different from the first interleave pattern is applied to the NOMA application range A42.

(B3) A first spreading code is applied to the NOMA application range A41, and a second spreading code different from the first spreading code is applied to the NOMA application range A42.

(B4) A first transmission power setting is applied to the NOMA application range A41, and a second transmission power setting different from the first transmission power setting is applied to the NOMA application range A42

Furthermore, depending on a difference in NOMA application range, the terminal device 40 may change an MA signature to be applied to the NOMA application range. For example, the terminal device 40 may change an MA signature to be applied, depending on the size of the NOMA application range. As an example, the terminal device 40 uses different MA signatures for a NOMA application range having a size of four resource blocks and a NOMA application range having a size of one resource block. For example, it is assumed that the MA signature to be applied is an interleave pattern. At this time, the terminal device 40 makes an interleave pattern length used for the NOMA application range having a size of four resource blocks four times longer than an interleave pattern length used for the NOMA application range having a size of one resource block. This can be similarly applied to an MA signature that is a spreading code or scramble code.

Note that in the above example, the terminal device 40 applies, to at least one of the plurality of NOMA application ranges included in the transmission unit data, the MA signature different from the MA signatures applied to other NOMA application ranges. In other words, the terminal device 40 performs, on at least one of the plurality of NOMA application ranges included in the transmission unit data, the NOMA transmission process having a process content different from NOMA transmission processes performed on the other NOMA application ranges included in the transmission unit data. However, the terminal device 40 may apply the same MA signature to all NOMA application ranges included in the transmission unit data. In other words, the terminal device 40 may apply the same NOMA transmission process on all NOMA application ranges included in the transmission unit data.

[Setting Examples of Division Patterns]

Various methods can be adopted to set the division patterns used by a terminal device 40 to the terminal device 40.

Setting Example 1

For example, a base station device 20 may notify the terminal device 40 of division pattern candidates that is available by the terminal device 40, in advance, before transmission data is generated in the terminal device 40. For example, before the transmission data is generated in the terminal device 40 (e.g., before receiving a resource allocation request from the terminal device 40), the base station device 20 notifies the terminal device 40 of several kinds of division pattern candidates in advance by using a control signal (e.g., RRC signaling). In the following description, information including the division pattern candidates is referred to as division pattern candidate information.

The division pattern candidate information may include, for example, division pattern information about four division patterns indicated in the following (C1) to (C4). It is assumed that in the four division patterns shown in (C1) to (C4), all of a plurality of NOMA application ranges included in transmission unit data have the same size. In addition, the size of one NOMA application range is shown as a division pattern. It should be noted that the division pattern information may include more information than the information indicated in the following (C1) to (C4). As a matter of course, the division pattern information is not limited to the following (C1) to (C4).

(C1) Division pattern 1: bandwidth of all resource blocks×1 slot (C2) Division pattern 2: bandwidth of two resource blocks×1 slot (C3) Division pattern 3: bandwidth of 1 resource block×1 slot (C4) Division pattern 4: bandwidth of 12 subcarriers×7 symbols Note that the base station device 20 may separately notify the terminal device 40 of whether the terminal device 40 finally uses which of division pattern candidates that have been previously notified of. For example, after transmission data is generated in the terminal device 40, the base station device 20 may designate one of the division pattern candidates by using downlink control information (DCI).

Setting Example 2

In setting example 1, the base station device 20 transmits the division pattern candidate information to the terminal device 40, but the division pattern candidate information may be set in the terminal device 40 in advance. For example, a predetermined default division pattern and one switching division pattern may be set in the storage unit 42 of the terminal device 40. The default division pattern and the one switching division pattern may have sizes as indicated in the following (D1) to (D2). The base station device 20 (e.g., the base station device 20) may separately notify the terminal device 40 of whether which one of the default division pattern and one switching division pattern is to be used, by using DCI or the like.

(D1) Default: bandwidth for all resource blocks×1 slot (D2) Switching: bandwidth of two resource blocks×one slot Setting Example 3

Furthermore, only the default division pattern may be set in the terminal device 40 in advance. For example, only the default division pattern may be set in the storage unit 42 of the terminal device 40 in advance. Then, the base station device 20 may notify the terminal device 40 of one division pattern by using a control signal (e.g., RRC signaling) before transmission data is generated in the terminal device 40. When the division pattern is notified of from the base station device 20, the terminal device 40 divides transmission unit data by using the division pattern notified of. Note that when the division pattern is not notified of from the base station device 20, the terminal device 40 may divide the transmission unit data by using the default division pattern.

At this time, in the default division pattern, all resource blocks included in the transmission unit data may be set as one NOMA application range. Furthermore, in a division pattern notified of from the base station device 20, one resource block may be set as one NOMA application range.

Setting Example 4

The terminal device 40 may change a division pattern to be used according to the size (e.g., the size of all resource blocks allocated from the base station device 20) of a resource allocated, for data transmission, to the base station device 20.

For example, it is assumed that all of a plurality of NOMA application ranges included in one piece of transmission unit data have the same size. At this time, if the number of all resource blocks allocated from the base station device 20 is four, the terminal device 40 sets the size of one NOMA application range to two resource blocks. On the other hand, if the number of all resource blocks allocated from the base station device 20 is eight, the terminal device 40 sets the size of one NOMA application range to four resource blocks.

Note that there may be a plurality of division pattern candidates. For example, it is assumed that the number of all resource blocks allocated by the base station device 20 is four. At this time, the division pattern candidates may be "one resource block/NOMA application range", "two resource blocks/NOMA application range", and "four resource blocks/NOMA application range". On the other hand, it is assumed that the number of all resource blocks allocated by the base station device 20 is eight. At this time, the division pattern candidates may be "two resource blocks/NOMA application range", "four resource blocks/NOMA application range", or "eight resource blocks/NOMA application range". Here, two resource blocks/NOMA application range indicates that the size of each of the plurality of NOMA application ranges included in one piece of transmission unit data is two resource blocks.

The terminal device 40 may determine a division pattern used by the terminal device 40 itself, on the basis of the size of a resource allocated to the terminal device 40, in the setting example 4 as well. Furthermore, the division pattern used by the terminal device 40 may be determined by the base station device 20 on the basis of the size of a resource allocated to the terminal device 40. In this configuration, the base station device 20 may designate a division pattern to be used for the terminal device 40.

Setting Example 5

The terminal device 40 may change a division pattern to be used according to a difference in data transmission mode (transmission sequence).

For example, in radio connection, a transmission mode for transmitting data to a communication device (e.g., a base station device 20) by a communication device (e.g., a terminal device 40) includes grant-based transmission (first transmission mode) and grant-free transmission (second transmission mode). The grant-based transmission represents, for example, transmission in which a radio resource is allocated from another communication device after transmission data is generated in a communication device. Furthermore, the grant-free transmission represents, for example, transmission in which no radio resource is allocated from a communication device after transmission data is generated in a communication device. The grant-based transmission and grant-free transmission will be described in detail later.

The terminal device 40 may change the division patterns to be used between the grant-based transmission and the grant-free transmission. For example, in a case where the grant-based transmission is employed, the terminal device 40 uses a first division pattern as a division pattern used for dividing transmission unit data. On the other hand, in a case where the grant-free transmission is employed, the terminal device 40 uses a second division pattern different from the first division pattern, as the division pattern used for dividing transmission unit data. Here, the first division pattern may be a division pattern designated by the base station device 20. Furthermore, the second division pattern may be a division pattern set (quasi-statically set) in the terminal device 40 in advance by the base station device 20 or the like before transmission data is generated.

[Specification Example of Division Pattern]

Various methods can be adopted for the base station device 20 to specify a division pattern to be used for the terminal device 40.

Specification Example 1

For example, the base station device 20 may designate a division pattern actually used by the terminal device 40 to the terminal device 40, after transmission data is generated in the terminal device 40 (e.g., after a resource allocation request is made from the terminal device 40).

For example, it is assumed that a plurality of division pattern candidates is set in the terminal device 40 before transmission data is generated in the terminal device 40. In this configuration, the base station device 20 may transmit information for designating a division pattern used by the terminal device 40 to the terminal device 40, after the transmission data is generated in the terminal device 40.

For example, as shown in the above setting example 1, it is assumed that the base station device 20 has previously notified of the four division pattern candidates by using the control signal (e.g., RRC signaling). Then, it is assumed that the storage unit 42 of the terminal device 40 has stored the division pattern information about the four division patterns. At this time, the base station device 20 notifies of one of the four division patterns by using two bits in DCI, after the resource allocation request is made from the terminal device 40. Then, the terminal device 40 performs a NOMA transmission process by using the division pattern (one of the four division patterns) designated in the DCI.

Furthermore, as shown in the above setting example 2, it is assumed that only one default division pattern and one switching division pattern have been set in the storage unit 42 of the terminal device 40. At this time, the base station device 20 notifies of whether the default division pattern is used or the switching division pattern is used, by using one bit in DCI. Then, the terminal device 40 performs a NOMA transmission process using a division pattern (default or switching division pattern) designated in the DCI.

Note that in the following description, the information for designating a division pattern to be used by the terminal device 40 is referred to as division pattern designation information. If the base station device 20 designates a division pattern to be used by the terminal device 40 by using two bits in the DCI, the two bits are the division pattern designation information. Furthermore, if the base station device 20 designates a division pattern to be used by the terminal device 40 by using one bit in the DCI, the one bit is the division pattern designation information.

Note that in the terminal device 40, use of an orthogonal resource used by another terminal device 40 (hereinafter, also referred to as OMA terminal) employing orthogonal multiple access to the base station device 20 also makes it possible to have non-orthogonal multiple access (NOMA) to the base station device 20. For example, if the OMA terminal uses a large amount of power to transmit data to the base station device 20, the terminal device 40 is allowed to transmit data to the base station device 20 with a small amount of power on a time-frequency resource used by the OMA terminal.

In this configuration, the base station device 20 may use one bit in DCI to notify of whether a resource to be used by the terminal device 40 is the resource used by the OMA terminal. This notification may be information for each of a plurality of NOMA application ranges included in transmission unit data. For example, the notification having zero bit indicates that no transmission data from the OMA terminal is multiplexed in the NOMA application range, and the notification having one bit indicates that transmission data from the OMA terminal is multiplexed in the NOMA application range.

Specification Example 2

The base station device 20 may designate a division pattern actually used by the terminal device 40 to the terminal device 40, before transmission data is generated in the terminal device (e.g., before a resource allocation request is made from the terminal device 40).

For example, the base station device 20 may designate a division pattern used by the terminal device 40 only by notification using DCI, without notification of division pattern candidate information using a control signal (e.g., RRC signaling). In this configuration, the base station device 20 may notify of, as the division pattern designation information, division pattern identification information defined in advance in the specification or the like. The division pattern identification information is information for identifying a division pattern. As an example, the division pattern identification information may be as follows.

P0: All resource blocks/NOMA application range
P1: four resource blocks/NOMA application range
P2: two resource blocks/NOMA application range
P3: 1 resource block/NOMA application range In the above example, P0 to P3 are each division pattern identification information. Here, "all resource blocks/NOMA application range represents that all resource blocks constituting one piece of transmission unit data are one NOMA application range. Furthermore, four resource blocks/NOMA application range represents that each of a plurality of NOMA application ranges included in one piece of transmission unit data has a size of four resource blocks. Still furthermore, two resource blocks/NOMA application range represents that each of a plurality of NOMA application ranges included in one piece of transmission unit data has a size of two resource blocks. Still another furthermore, 1 resource block/NOMA application range represents that each of a plurality of NOMA application ranges included in one piece of transmission unit data has a size of one resource block. Note that the division pattern identification information may be simply numerically indicated. The division pattern identification information can be also referred to as an index or the like.

4. OPERATIONS OF COMMUNICATION SYSTEM

Next, the operations of the communication system 1 will be described. Firstly, transmission of data (uplink) from a terminal device 40 to a base station device 20 will be described. Uplink data transmission is divided into a "transmission/reception process (grant based)" and a "transmission/reception process (grant-free)".

<4-1. Transmission/Reception Process (Grant Based)>

Figure 22:
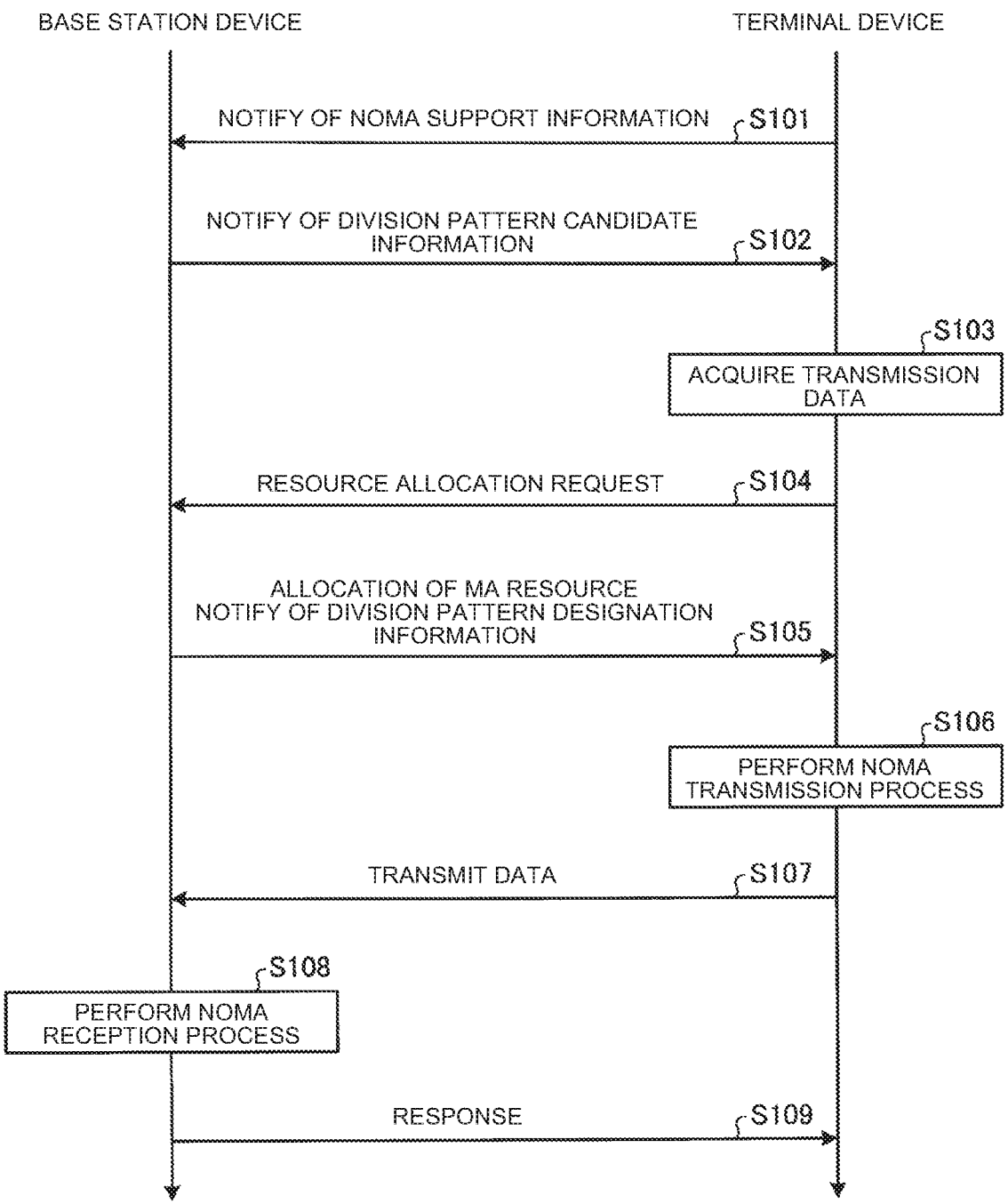
FIG. 22 is a sequence diagram illustrating an example of a transmission/reception process (grant based) according to an embodiment of the present disclosure.

Firstly, the "transmission/reception process (grant based)" will be described. The transmission/reception process (grant based) is a process in which the terminal device 40 receives dynamic resource allocation (grant) from the base station device 20 and thereby transmits data. FIG. 22 is a sequence diagram illustrating an example of the transmission/reception process (grant based) according to an embodiment of the present disclosure. The transmission/reception process (grant based) will be described below with reference to FIG. 22. The transmission/reception process (grant based) described below is performed, for example, when the terminal device 40 is connected (RRC_CONNECTED) to the base station device 20.

Firstly, the transmitting unit 455 of the terminal device 40 transmits NOMA support information to the connected base station device 20 (step S101). The NOMA support information is information indicating whether the terminal device 40 supports NOMA (e.g., whether a NOMA transmission process is performed). The NOMA support information may include information about a non-orthogonal resource available by the terminal device 40.

The reception unit 233 of the base station device 20 receives the NOMA support information from the terminal device 40. If the terminal device 40 supports NOMA, the acquisition unit 231 of the base station device 20 acquires division pattern candidate information to be transmitted to the terminal device 40, from the storage unit 22. Then, the transmitting unit 235 of the base station device 20 transmits, to the terminal device 40, the division pattern candidate information together with information indicating use of NOMA transmission (step S102). This transmission may be performed using RRC signaling.

The reception unit 453 of the terminal device 40 receives the division pattern candidate information from the base station device 20 and stores the division pattern candidate information in the storage unit 22. Then, the acquisition unit 451 of the terminal device 40 acquires transmission data (step S103). For example, the acquisition unit 451 acquires, as the transmission data, data generated as data to be transmitted to another communication device by various programs in the terminal device 40. Then, the transmitting unit 455 of the terminal device 40 transmits a resource allocation request to the base station device 20 (step S104).

The reception unit 233 of the base station device 20 receives the resource allocation request from the terminal device 40. Then, the processing unit 232 of the base station device 20 determines an MA resource to be allocated to the terminal device 40 and a division pattern to be designated to the terminal device 40. Then, the transmitting unit 235 of the base station device 20 transmits information (MA resource information) about the MA resource allocated to the terminal device 40 and division pattern information (division pattern designation information) about the division pattern to be designated to the terminal device 40, to the terminal device 40 (step S105). The MA resource information includes information about MA signatures to be allocated to a plurality of NOMA application ranges.

The reception unit 453 of the terminal device 40 receives the MA resource information and the division pattern designation information from the base station device 20 and stores the MA resource information and the division pattern designation information in the storage unit 42. Then, the terminal device 40 performs a NOMA transmission process on transmission unit data on the basis of the MA resource information and the division pattern designation information (step S106).

Specifically, the acquisition unit 451 of the terminal device 40 acquires, on the basis of the division pattern designation information, division pattern information about a division pattern to be used for the NOMA transmission process from among a plurality of division pattern candidates stored in the storage unit 42. Then, the processing unit 452 of the terminal device 40 divides the transmission unit data into a plurality of NOMA application ranges on the basis of the division pattern information acquired by the acquisition unit 451. Then, the processing unit 452 identifies the MA signature to be applied to each NOMA application range on the basis of the MA resource information and applies the identified MA signature to each NOMA application range. The MA signatures applied to the respective NOMA application ranges may be the same or different.

When the NOMA transmission process is completed, the transmitting unit 455 of the terminal device 40 transmits data obtained after the NOMA transmission process to the base station device 20 (step S107).

The reception unit 233 of the base station device 20 receives the data obtained after the NOMA transmission process, from the terminal device 40. The data received from the terminal device 40 is multiplexed data in which data transmitted by another terminal device 40 is non-orthogonally multiplexed. Then, the base station device 20 performs a NOMA reception process on the multiplexed data to extract the data transmitted by the terminal device 40 from the multiplexed data (step S108).

For example, the acquisition unit 231 of the base station device 20 acquires, from the storage unit 22, NOMA transmission process information used by the terminal device 40. At this time, the NOMA transmission process information may include the division pattern designation information. Furthermore, the NOMA transmission process information may include the information about an MA signature to be applied to each NOMA application range. Then, on the basis of the NOMA transmission process information acquired by the acquisition unit 231, the separation unit 234 of the base station device 20 separates, from the multiplexed data, the data transmitted by the terminal device 40.

When the separation is completed, the transmitting unit 235 of the base station device 20 transmits response data (e.g., positive acknowledgement) to the terminal device 40 (step S109). When the transmission of the response data is completed, the communication system 1 finishes the transmission/reception process (grant based).

<4-2. Transmission/Reception Process (Grant-Free)>

Next, "transmission/reception process (grant-free)" will be described. The transmission/reception process (grant-free) is a process of transmitting data from a terminal device 40 to a base station device 20 by using grant-free transmission. Here, the grant-free transmission represents transmission performed by a communication device, in which the communication device uses an appropriate resource from available frequency-time resources designated by another communication device in advance, without receiving dynamic resource allocation (grant) from the another communication device. In other words, the grant-free transmission represents that data transmission is performed without including grant in DCI. The grant-free transmission is also called to as data transmission without grant, configured grant, semi persistent scheduling, or the like.

In the grant-free transmission, the base station device 20 may designate in advance frequency-time resource candidates that the terminal device 40 can select. The main purpose of this is to reduce signaling overhead to reduce power consumption of the terminal device 40 or achieve low latency communication. In a grant-based transmission/reception process, the base station device 20 notifies the terminal device 40 of resources used in uplink and sidelink. Therefore, the terminal device 40 is allowed to perform communication without resource contention with another terminal device 40. However, this method unfortunately causes signaling overhead due to notification.

A specific description will be given using the sequence of FIG. 22. In the example of FIG. 22, when data is generated (step S103), the terminal device 40 makes a resource allocation request to the base station device 20 (step S104). The base station device 20 allocates a resource to the terminal device 40 in response to the resource allocation request (step S105). The terminal device 40 transmits data by using the resource allocated by the base station device 20 (step S107). In the example of FIG. 22, signaling overhead occurs in steps S104 and S105.

In the grant-free transmission, it is possible to reduce the processing of step S104 and step S105 in the example of FIG. 22. Therefore, in reduced power consumption and low latency communication that are required for next-generation communications, the grant-free transmission without resource allocation notification is considered as a leading technology candidate. The transmission resource in the grant-free transmission may be selected from all available bands or may be selected from resources designated by the base station device 20 in advance.

Figure 23:
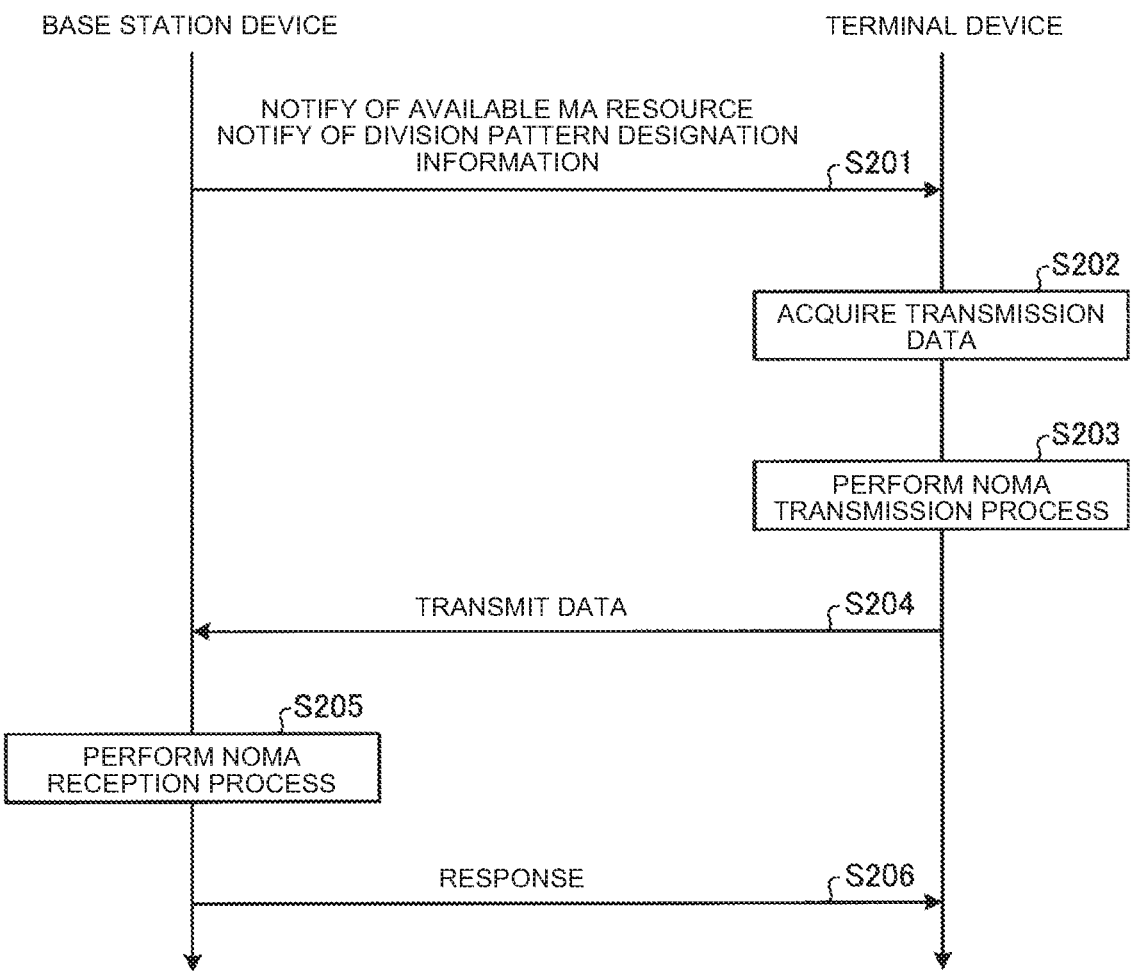
FIG. 23 is a sequence diagram illustrating an example of a transmission/reception process (grant-free) according to an embodiment of the present disclosure.

FIG. 23 is a sequence diagram illustrating an example of a transmission/reception process (grant-free) according to an embodiment of the present disclosure. In the transmission/reception process (grant-free), before transmission data is generated in the terminal device 40, the terminal device 40 acquires division pattern information or division pattern designation information from the base station device 20. The transmission/reception process (grant-free) will be described below with reference to FIG. 23. The transmission/reception process (grant-free) described below is performed, for example, when the terminal device 40 is connected (RRC_CONNECTED) to the base station device 20.

When the terminal device 40 is connected, the processing unit 232 of the base station device 20 determines an MA resource to be allocated to the terminal device 40 and a division pattern to be designated to the terminal device 40. Then, the transmitting unit 235 of the base station device 20 transmits information (MA resource information) about the MA resource allocated to the terminal device 40 and division pattern information about the division pattern to be designated to the terminal device 40, to the terminal device 40 (step S201). The MA resource information includes information about MA signatures to be allocated to a plurality of NOMA application ranges. Note that the transmitting unit 235 may transmit division pattern designation information instead of the division pattern information. Furthermore, the transmitting unit 235 may transmit division pattern candidate information to the terminal device 40, instead of the division pattern designation information.

The reception unit 453 of the terminal device 40 receives the MA resource information and the division pattern designation information from the base station device 20 and stores the MA resource information and the division pattern designation information in the storage unit 22. Then, the acquisition unit 451 of the terminal device 40 acquires the generated transmission data (step S202). For example, the acquisition unit 451 acquires, as the transmission data, data generated as data to be transmitted to another communication device by various programs in the terminal device 40.

Then, the processing unit 452 of the terminal device 40 performs a NOMA transmission process on transmission unit data on the basis of the MA resource information and the division pattern designation information stored in the storage unit 22 (step S203). If the division pattern candidate information is acquired instead of the division pattern designation information in step S201, the processing unit 452 may select a division pattern used for the NOMA transmission process from candidates. When the NOMA transmission process is completed, the transmitting unit 455 of the terminal device 40 transmits data obtained after the NOMA transmission process to the base station device 20 (step S204).

The reception unit 233 of the base station device 20 receives the data obtained after the NOMA transmission process, from the terminal device 40. The data received from the terminal device 40 is multiplexed data in which data transmitted by another terminal device 40 is non-orthogonally multiplexed. Then, the base station device 20 performs a NOMA reception process on the multiplexed data to extract the data transmitted by the terminal device 40 from the multiplexed data (step S205). For example, the acquisition unit 231 of the base station device 20 acquires NOMA transmission process information used by the terminal device 40. Then, on the basis of the NOMA transmission process information acquired by the acquisition unit 231, the separation unit 234 of the base station device 20 separates, from the multiplexed data, the data transmitted by the terminal device 40.

When the separation is completed, the transmitting unit 235 of the base station device 20 transmits response data (e.g., positive acknowledgement) to the terminal device 40 (step S206). When the transmission of the response data is completed, the communication system 1 finishes the transmission/reception process (grant-free).

<4-3. Transmission/Reception Process (Downlink)>

Figure 24:
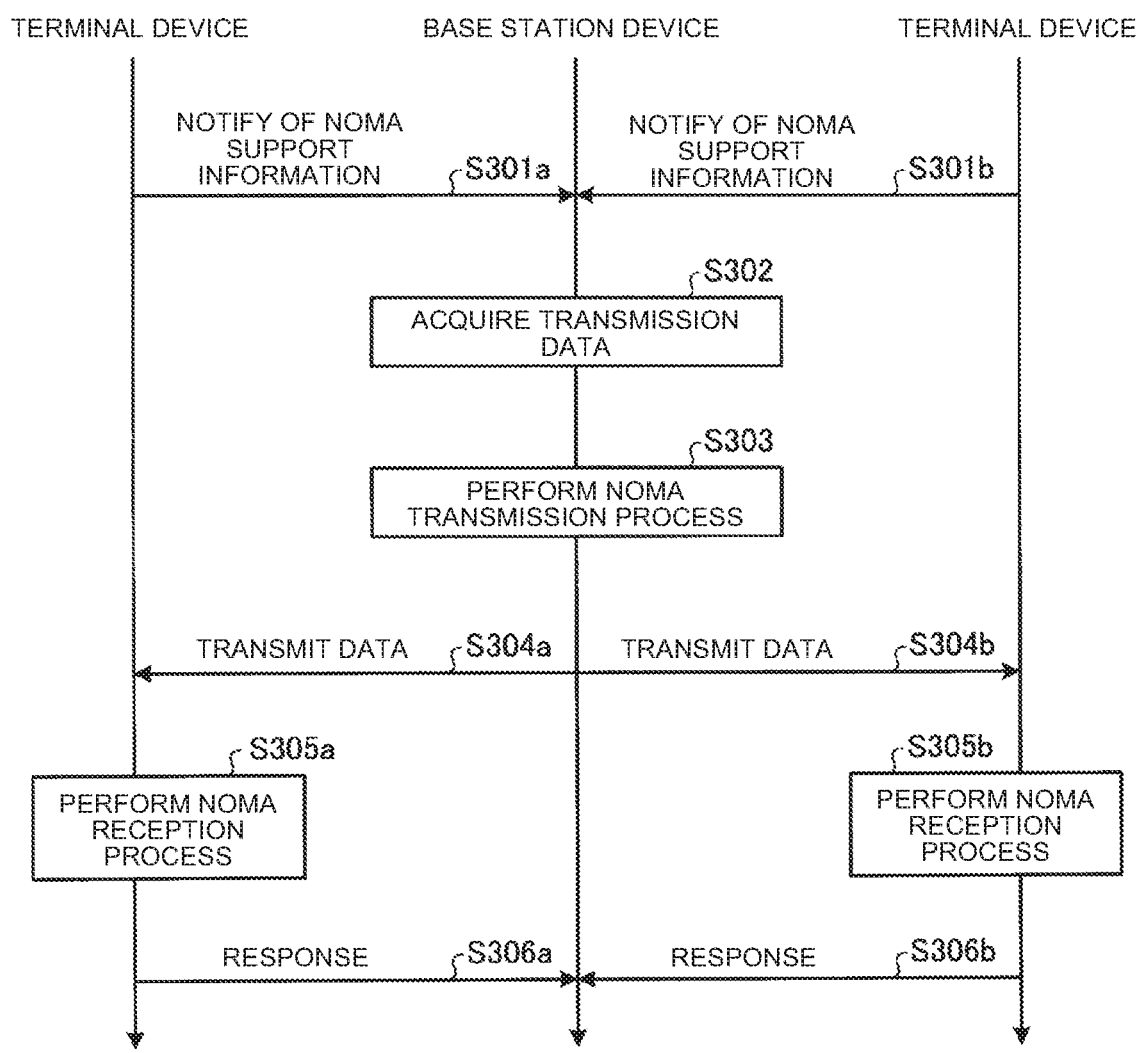
FIG. 24 is a sequence diagram illustrating an example of a transmission/reception process (downlink) according to an embodiment of the present disclosure.

Next, transmission of data (downlink) from a base station device 20 to a terminal device 40 will be described. FIG. 24 is a sequence diagram illustrating an example of the transmission/reception process (downlink) according to an embodiment of the present disclosure. FIG. 24 illustrates an example of transmission of data obtained by non-orthogonal multiplexing to two terminal devices 40 by the base station device 20. The transmission/reception process (grant based) will be described below with reference to FIG. 24. The transmission/reception process (grant based) described below is performed, for example, when the two terminal devices 40 are connected (RRC_CONNECTED) to the base station device 20. In the following description, the two terminal devices 40 are simply referred to as terminal device 40.

Firstly, the transmitting unit 455 of the terminal device 40 transmits NOMA support information to the connected base station device 20 (step S301a, step S301b).

The reception unit 233 of the base station device 20 receives the support information from the terminal device 40. Then, the acquisition unit 231 of the base station device 20 acquires transmission data to be transmitted to each of the two terminal devices 40 (step S302). For example, the acquisition unit 231 acquires, as the transmission data, data generated as data to be transmitted to another communication device by various programs in the base station device 20.

Then, the processing unit 232 of the base station device 20 performs a NOMA transmission process on transmission unit data (step S303). When the NOMA transmission process is completed, the transmitting unit 235 of the base station device 20 transmits a plurality of pieces of data obtained after the NOMA transmission process to the terminal devices 40 (steps S304*a* and S304*b*). At this time, the transmitting unit 235 may non-orthogonally multiplex and transmit the plurality of sets of data obtained after the NOMA transmission process or may transmit the plurality of sets of data obtained after the NOMA transmission process from different antennas to multiplex the data on a transmission channel. In addition, the transmitting unit 235 may transmit division pattern information about a division pattern having been used for the NOMA transmission process or information about an MA signature having been applied to each NOMA application range to the two terminal devices 40.

The reception unit 453 of each terminal device 40 receives the data obtained after the NOMA transmission process from the base station device 20. The data received from the base station device 20 is multiplexed data in which a plurality of pieces of data obtained after NOMA transmission process are non-orthogonally multiplexed. Then, the terminal device 40 performs a NOMA reception process on the multiplexed data to extract the data transmitted to itself from the multiplexed data (steps S305*a* and S305*b*). For example, the acquisition unit 451 of the terminal device 40 acquires NOMA transmission process information having been used by the base station device 20 (e.g., division pattern information or information about an MA signature). Then, the separation unit 454 of the terminal device 40 separates the data transmitted to itself from the multiplexed data, on the basis of the NOMA transmission process information acquired by the acquisition unit 451.

When the separation is completed, the transmitting unit 455 of the terminal device 40 transmits response data (e.g., positive acknowledgement) to the base station device 20 (step S306*a*, step S306*b*). When the transmission of the response data is completed, the communication system 1 finishes the transmission/reception process (grant-free).

5. MODIFICATIONS

The embodiments described above are merely examples, and various modifications and applications are possible.

<5-1. Modifications of Transmission/Reception Process>

Any of the transmission/reception processes (grant based, grant-free, downlink) described in the above embodiments is a transmission/reception process in communication between the base station device 20 and the terminal device 40. However, the transmission/reception processes described above are also applicable to communication between a relay device 30 and a terminal device 40. In this configuration, the base station device 20 appearing in the transmission/reception processes (grant based, grant-free, downlink) described above is appropriately replaced with the relay device 30.

Furthermore, the transmission/reception processes (grant based, grant-free, downlink) described above are also applicable to communication between a base station device 20 and a relay device 30. In this configuration, the terminal device 40 appearing in the transmission/reception processes (grant based, grant-free, downlink) described above is appropriately replaced with the relay device 30.

Furthermore, the transmission/reception processes (grant based, grant-free, downlink) described above are also applicable to communication (sidelink) between terminal devices 40 and 40. In this configuration, the base station device 20 appearing in the transmission/reception processes (grant based, grant-free, downlink) described above is appropriately replaced with the terminal device 40. The terminal device 40 may separately acquire MA resource allocation or division pattern information (division pattern candidate information, division pattern designation information) from the base station device 20.

Furthermore, the transmission/reception processes (grant based, grant-free, downlink) described above are also applicable to communication between base station devices 20 and communication between a relay device 30 and a base station device 20. In this configuration, the base station device 20 and the terminal device 40 that appear in the transmission/reception processes (grant based, grant-free, downlink) described above are appropriately replaced with the base station device 20 or the relay device 30.

<5-2. Modifications of NOMA Application Range>

In the embodiments described above, the communication device performs the NOMA transmission process on a partial range of the transmission unit data. More specifically, the communication device performs the NOMA transmission processes having the same or different process contents, on the plurality of NOMA application ranges included in the transmission unit data. However, the communication device may perform the NOMA transmission process, not on the transmission data but on a partial range of the transmission data. For example, the communication device may divide the transmission data into a plurality of NOMA application ranges to perform the NOMA transmission processes having the same or different process contents, on the plurality of NOMA application ranges. Here, the communication device may be any of a base station device 20, a relay device 30, and a terminal device 40.

Note that although the transmission data and the transmission unit data are distinguished from each other in the embodiments described above, the transmission unit data can be regarded as the transmission data itself.

As described above, in a communication device configured to perform NOMA communication, use of the orthogonal resource used by another communication device (hereinafter referred to as OMA terminal) employing orthogonal multiple access also makes it possible to have non-orthogonal multiple access to the another communication device. Therefore, the base station device 20 may allocate a partial range of the transmission data transmitted by the terminal device 40, onto the orthogonal resource (frequency-time resource) used by the terminal device (OMA terminal) employing orthogonal multiple access.

For example, the base station device 20 allocates some of the NOMA application ranges (hereinafter, referred to as a designated NOMA application range) of the transmission unit data transmitted by the terminal device 40 onto the orthogonal resource used by the terminal device (OMA terminal) employing orthogonal multiple access. At this time, the transmitting unit 235 of the base station device 20 may add, to the division pattern information to be transmitted to the terminal device 40, information indicating that the designated NOMA application range is allocated onto the orthogonal resource used by the OMA terminal. Then, the transmitting unit 455 of the terminal device 40 non-orthogonally multiplexes the data of the partial range of the transmission data (e.g., specified NOMA application range) with the data transmitted by the OMA terminal.

The terminal device 40 is configured to perform the NOMA transmission process on a partial range of the transmission data (transmission unit data) instead of all transmission data (transmission unit data). Therefore, the communication system 1 can allocate only part of the transmission data (transmission unit data) onto the orthogonal resource used by the OMA terminal employing orthogonal multiple access. Thus, the communication system 1 can improve frequency utilization efficiency.

This modification is applicable not only to communication between the base station device 20 and the terminal device 40 but also to communication between communication devices (e.g., communication between a relay device 30 and a terminal device 40). For example, the base station device 20 may allocate a partial range of the transmission data (transmission unit data) to be transmitted to the terminal device 40 onto the orthogonal resource to be used by the OMA terminal.

Furthermore, in the embodiments described above, the data transmitted by a communication device (e.g., a base station device 20, relay device 30, or terminal device 40) is non-orthogonally multiplexed with the data transmitted by another communication device. However, the communication device may orthogonally multiplex data that the communication device transmits by itself. For example, the communication device may non-orthogonally multiplex data in a plurality of NOMA application ranges included in the transmission unit data (or transmission data). Referring now more specifically to the example of FIG. 18, the processing unit 452 of the terminal device 40$_1$ applies the MA signature #0 to the NOMA application range #0 of the transmission signal set D10 and applies the MA signature #1 to the NOMA application range #1 of the transmission signal set D10. Then, the data in NOMA application range #0 and the data in the NOMA application range #1 are transmitted on the same orthogonal resource (on the time-frequency resource). The communication system 1 can improve flexibility of resource usage.

Furthermore, in the embodiments described above, a communication device applies the MA signatures to all of the plurality of NOMA application ranges included in the transmission unit data, but the communication device may not necessarily apply the MA signatures to all NOMA application ranges included in the transmission unit data. For example, the communication device does not apply the MA signatures to some NOMA application ranges of the plurality of NOMA application ranges included in the transmission unit data. At this time, the communication device may perform OMA transmission (transmission using orthogonal multiple access) to transmit data in an NOMA application range to which no MA signature is applied, to another communication device. Alternatively, the communication device may use, as dummy data (e.g., zero-padded data), data in the NOMA application range to which no MA signature is applied, performing NOMA transmission. The communication system 1 can improve flexibility of resource usage.

<5-3. Other Modifications>

A control device that controls a management device 10, a base station device 20, a relay device 30, or a terminal device 40 according to the present embodiment may be achieved by a dedicated computer system or a general-purpose computer system.

For example, a communication program for performing an operation described above (e.g., NOMA transmission process, NOMA reception processing, or transmission/reception process (grant based, grant-free, downlink), etc.) is stored in a computer-readable recording medium such as an optical disk, semiconductor memory, magnetic tape, or flexible disk. Then, for example, the program is installed on a computer, the process described above is performed, and the control device is configured. At this time, the control device may be a device (e.g., a personal computer) outside the base station device 20, relay device 30, or terminal device 40. Furthermore, the control device may be a device (e.g., the control unit 23, the control unit 34, or the control unit 45) inside the base station device 20, relay device 30, or terminal device 40.

Furthermore, the communication program may be stored in a disk device included in a server device on a network such as the Internet so as to be, for example, downloaded to a computer. Furthermore, the functions described above may be achieved by cooperation between an operating system (OS) and application software. In this configuration, the portion other than the OS may be stored in a medium for distribution, or the portion other than the OS may be stored in the server device for download or the like to the computer.

Furthermore, in each process described in the above embodiments, all or part of the process described to be performed automatically may be performed manually or all or part of the process described as to be performed manually may be performed automatically by a known method. In addition, the processing procedures, specific names, and information including various data and parameters, which are shown in the above description or the drawings can be appropriately changed unless otherwise specified. For example, various information illustrated in the drawings is not limited to the information illustrated.

In addition, the component elements of the devices are illustrated as functional concepts and are not necessarily required to be physically configured as illustrated. In other words, the specific forms of distribution or integration of the devices are not limited to those illustrated, and all or part thereof may be configured by functionally or physically distributed or integrated in any units, according to various loads or usage condition.

Furthermore, the embodiments described above can be appropriately combined within a range consistent with process contents. Furthermore, the orders of the steps illustrated in the sequence diagrams of the embodiments described above can be changed appropriately.

6. CONCLUSION

As described above, according to an embodiment of the present disclosure, the communication devices (a base station device 20, a relay device 30, and a terminal device 40) each perform a NOMA transmission process on a partial range of transmission data to be transmitted to another communication device. For example, the communication device divides one piece of transmission unit data (e.g., transport block) into a plurality of NOMA application ranges and performs a NOMA transmission process using a predetermined MA signature on each of the plurality of NOMA application ranges. This allows the communication system 1 to flexibly allocate an MA resource to each communication device according to the status of each communication device, and thus, the communication system 1 can efficiently use resources as a whole. Thus, the communication system 1 can achieve high frequency efficiency.

Although the embodiments of the present disclosure have been described above, the technical scope of the present disclosure is not limited to the embodiments described above and various modifications and alterations can be made without departing from the spirit and scope of the present disclosure. Moreover, the component elements of different embodiments or modifications may be suitably combined with each other.

Furthermore, the effects of the embodiments in the description are merely examples and are not intended to restrict the present disclosure, and other effects may be provided.

Note that the present technology can also have the following configurations.

(1)

A communication device comprising:

a processing unit that performs a NOMA transmission process on a partial range of transmission data to be transmitted to another communication device, the NOMA transmission process being signal processing for non-orthogonal multiple access; and a transmitting unit that transmits data obtained after the NOMA transmission process to the another communication device.

(2)

The communication device according to (1), wherein the processing unit performs the NOMA transmission process on a partial range of transmission unit data being a transmission unit of the transmission data.

(3)

The communication device according to (2), wherein the processing unit performs, on a plurality of ranges included in the transmission unit data, the NOMA transmission processes having the same or different process contents.

(4)

The communication device according to (3), wherein the processing unit performs, on at least one of the plurality of ranges included in the transmission unit data, the NOMA transmission process having a process content different from that of the NOMA transmission process performed on the other range included in the transmission unit data.

(5)

The communication device according to (3) or (4), further comprising an acquisition unit that acquires division pattern information about a division pattern used for dividing the transmission unit data into a plurality of ranges, wherein the processing unit performs, on a plurality of ranges of the transmission unit data divided based on the division pattern information, the NOMA transmission processes having the same or different process contents.

(6)

The communication device according to (5), wherein the acquisition unit acquires the division pattern information or information for designating the division pattern, from the another communication device, before the transmission data is generated.

(7)

The communication device according to (5) or (6), further comprising a storage unit that stores a plurality of the division pattern information, wherein the acquisition unit acquires information for designating the division pattern, from the another communication device and acquires division pattern information about the division pattern designated by the another communication device, from the storage unit, and the processing unit performs, on the plurality of ranges of the transmission unit data divided based on the division pattern information acquired by the acquisition unit, the NOMA transmission processes having the same or different process contents.

(8)

The communication device according to any one of (5) to (7), wherein the processing unit uses a first division pattern as the division pattern used for dividing the transmission unit data, when transmission of the transmission unit data in the transmitting unit uses a first transmission mode in which a radio resource is allocated from the another communication device after the transmission data is generated, and uses a second division pattern different from the first division pattern, as the division pattern used for dividing the transmission unit data, when transmission of the transmission unit data in the transmitting unit uses a second transmission mode in which no radio resource is allocated from the another communication device after the transmission data is generated.

(9)

The communication device according to any one of (2) to (8), wherein the transmission unit data is one transport block including a plurality of resource blocks, and the processing unit performs the NOMA transmission process on one or a plurality of resource blocks of the transport block.

(10)

The communication device according to any one of (1) to (9), wherein the partial range of the transmission data is allocated onto an orthogonal resource used by a terminal device employing orthogonal multiple access, and the transmitting unit non-orthogonally multiplexes data of the partial range of the transmission data with data transmitted by the terminal device employing orthogonal multiple access.

(11)

A communication device comprising:

an acquisition unit that acquires NOMA transmission process information about a NOMA transmission process used by another communication device configured to execute the NOMA transmission process being signal processing for non-orthogonal multiple access;

a reception unit that receives multiplexed data being transmission data transmitted from the another communication device, the transmission data having a partial range on which the NOMA transmission process is performed; and a separation unit that separates the transmission data from the multiplexed data, based on the NOMA transmission process information acquired by the acquisition unit.

(12)

The communication device according to (11), wherein the reception unit receives the multiplexed data including the transmission unit data being a transmission unit of the transmission data and having a partial range on which the NOMA transmission process is performed, the transmission unit data, and the separation unit separates the transmission unit data from the multiplexed data, based on the NOMA transmission process information acquired by the acquisition unit.

(13)

The communication device according to (12), wherein the reception unit receives the multiplexed data including the transmission unit data having a plurality of ranges on which the NOMA transmission processes having the same or different process contents are performed, and the separation unit separates the transmission unit data from the multiplexed data based on the NOMA transmission process information acquired by the acquisition unit.

(14)

The communication device according to (13), further comprising:

a transmitting unit that transmits division pattern information about a division pattern used for dividing the transmission unit data into a plurality of ranges, to the another communication device, wherein the acquisition unit acquires the NOMA transmission process information including the division pattern information transmitted by the transmitting unit, and the separation unit separates the transmission unit data from the multiplexed data based on the NOMA transmission process information including the division pattern information.

(15)

The communication device according to (13) or (14), further comprising a transmitting unit that transmits information for designating the division pattern to the another communication device storing division pattern information about a division pattern used for dividing the transmission unit data into a plurality of ranges, wherein the acquisition unit acquires the NOMA transmission process information including the division pattern information about the division pattern designated by the information transmitted by the transmitting unit, and the separation unit separates the transmission unit data from the multiplexed data based on the NOMA transmission process information including the division pattern information.

(16)

The communication device according to any one of (11) to (15), further comprising:

a transmitting unit that transmits, to the another communication device, information for allocating the partial range of the transmission data onto an orthogonal resource used by a terminal device employing orthogonal multiple access.

(17)

A communication method comprising:

performing, on a partial range of transmission data to be transmitted to another communication device, a NOMA transmission process being signal processing for non-orthogonal multiple access; and transmitting data obtained after the NOMA transmission process to the another communication device.

(18)

A communication method comprising:

acquiring NOMA transmission process information about a NOMA transmission process used by another communication device configured to execute the NOMA transmission process being signal processing for non-orthogonal multiple access;

receiving multiplexed data being transmission data transmitted from the another communication device, the transmission data having a partial range on which the NOMA transmission process is performed; and separating the transmission data from the multiplexed data, based on the NOMA transmission process information acquired by the acquisition unit.

(19)

A communication program causing
a computer included in a communication device
to function as:
a processing unit that performs a NOMA transmission process on a partial range of transmission data to be transmitted to another communication device, the NOMA transmission process being signal processing for non-orthogonal multiple access; and a transmitting unit that transmits data obtained after the NOMA transmission process to the another communication device.

(20)

A communication program causing
a computer included in a communication device
to function as:
an acquisition unit that acquires NOMA transmission process information about a NOMA transmission process used by another communication device configured to execute the NOMA transmission process being signal processing for non-orthogonal multiple access;

a reception unit that receives multiplexed data being transmission data transmitted from the another communication device, the transmission data having a partial range on which the NOMA transmission process is performed; and a separation unit that separates the transmission data from the multiplexed data, based on the NOMA transmission process information acquired by the acquisition unit.

REFERENCE SIGNS LIST

1 COMMUNICATION SYSTEM
10 MANAGEMENT DEVICE
20 BASE STATION DEVICE
30 RELAY DEVICE
40 TERMINAL DEVICE
12, 22, 32, 42 STORAGE UNIT
211, 311, 411 RECEPTION PROCESSING UNIT
211*a*, 411*a* RADIO RECEPTION UNIT
211*b*, 411*b* DEMULTIPLEXING UNIT
211*c*, 411*c* DEMODULATION UNIT
211*d*, 411*d* DECODING UNIT
212, 312, 412 TRANSMISSION PROCESSING UNIT
212*a*, 412*a* ENCODING UNIT
212*b*, 412*b* MODULATION UNIT
212*c*, 412*c* MULTIPLEXING UNIT
212*d*, 412*d* RADIO TRANSMITTING UNIT
213, 313, 413 ANTENNA
231, 451 ACQUISITION UNIT
232, 452 PROCESSING UNIT
233, 453 RECEPTION UNIT
234, 454 SEPARATION UNIT
235, 455 TRANSMITTING UNIT

The invention claimed is:

1. A first communication device, comprising:
circuitry configured to:
acquire division pattern information about a division pattern used for division of transmission unit data into a plurality of ranges;
perform non-orthogonal multiple access (NOMA) transmission processes on the plurality of ranges of the transmission unit data to be transmitted to a second communication device, wherein
each of the NOMA transmission processes is signal processing for non-orthogonal multiple access, and
the NOMA transmission processes, having same or different process contents, are performed on the plurality of ranges of the transmission unit data divided based on the division pattern information; and
transmit data obtained after the NOMA transmission processes to the second communication device.

2. The first communication device according to claim 1, wherein a partial range of transmission unit data is a transmission unit of data.

3. The first communication device according to claim 1, wherein
a NOMA transmission process, performed on at least one of the plurality of ranges of the transmission unit data, has a process content different from that of NOMA transmission processes performed on other ranges of the plurality of ranges of the transmission unit data.

4. The first communication device according to claim 1, wherein
the circuitry is further configured to acquire one of the division pattern information or information for designating the division pattern, from the second communication device.

5. The first communication device according to claim 1, further comprising
a storage unit configured to store a plurality of the division pattern information,
wherein the circuitry is further configured to:
acquire information for designating the division pattern, from the second communication device, and
acquire the division pattern information about the division pattern designated by the second communication device, from the storage unit.

6. The first communication device according to claim 1, wherein
the circuitry configured to
use a first division pattern as the division pattern used for the division of the transmission unit data, when transmission of the transmission unit data uses a first transmission mode in which a radio resource is allocated from the second communication device, and
use a second division pattern, different from the first division pattern, as the division pattern used for the division of the transmission unit data, when transmission of the transmission unit data uses a second transmission mode in which no radio resource is allocated from the second communication device.

7. The first communication device according to claim 1, wherein
the transmission unit data is one transport block including a plurality of resource blocks, and
the circuitry is further configured to perform a NOMA transmission process on one or the plurality of resource blocks of the transport block.

8. The first communication device according to claim 1, wherein
a partial range of the transmission unit data is allocated onto an orthogonal resource used by a terminal device employing an orthogonal multiple access, and
the circuitry is further configured to non-orthogonally multiplex data of the partial range of the transmission unit data with data transmitted by the terminal device employing orthogonal multiple access.

9. A first communication device, comprising:
circuitry configured to:
transmit division pattern information about a division pattern used for division of transmission unit data into a plurality of ranges, to a second communication device;
acquire non-orthogonal multiple access (NOMA) transmission process information about a NOMA transmission process used by a second communication device configured to execute the NOMA transmission process, wherein
the acquired NOMA transmission process information includes the transmitted division pattern information, and
the NOMA transmission process is signal processing for non-orthogonal multiple access;
receive multiplexed data being the transmission unit data transmitted from the second communication device, wherein the transmission unit data has a partial range on which the NOMA transmission process is performed; and
separate the transmission unit data from the multiplexed data, based on the acquired NOMA transmission process information including the division pattern information.

10. The first communication device according to claim 9, wherein the circuitry is further configured to receive the multiplexed data including the transmission unit data being a transmission unit.

11. The first communication device according to claim 10, wherein the circuitry is further configured to:
receive the multiplexed data including the transmission unit data having the plurality of ranges on which the NOMA transmission processes having same or different process contents are performed, and
separate the transmission unit data from the multiplexed data based on the acquired NOMA transmission process.

12. The first communication device according to claim 11, wherein the circuitry is further configured to:
transmit information for designating the division pattern to the second communication device storing the division pattern information about the division,
acquire the NOMA transmission process information including the division pattern information about the division pattern designated by the transmitted information, and
separate the transmission unit data from the multiplexed data based on the NOMA transmission process information including the division pattern information.

13. The first communication device according to claim 9, wherein the circuitry is further configured to:
transmit, to the second communication device, information for allocating the partial range of the transmission unit data onto an orthogonal resource used by a terminal device employing orthogonal multiple access.

14. A communication method, comprising:
in a first communication device:
acquiring division pattern information about a division pattern used for division of transmission unit data into a plurality of ranges;
performing non-orthogonal multiple access (NOMA) transmission processes on the plurality of ranges of the transmission unit data to be transmitted to a second communication device, wherein
each of the NOMA transmission processes is signal processing for non-orthogonal multiple access, and
the NOMA transmission processes, having same or different process contents, are performed on the plurality of ranges of the transmission unit data divided based on the division pattern information; and
transmitting data obtained after the NOMA transmission processes to the second communication device.

15. A communication method, comprising:

in a first communication device:

transmitting division pattern information about a division pattern used for division of transmission unit data into a plurality of ranges, to a second communication device;

acquiring non-orthogonal multiple access (NOMA) transmission process information about a NOMA transmission process used by a second communication device configured to execute the NOMA transmission process, wherein the acquired NOMA transmission process information includes the transmitted division pattern information, and the NOMA transmission process is signal processing for non-orthogonal multiple access;

receiving multiplexed data being the transmission unit data transmitted from the second communication device, wherein the transmission unit data has a partial range on which the NOMA transmission process is performed; and separating the transmission unit data from the multiplexed data, based on the acquired NOMA transmission process information including the division pattern information.

16. A non-transitory computer-readable medium having stored thereon computer-executable instructions that, when executed by a processor in a first communication device, cause the processor to execute operations, the operations comprising:

acquiring division pattern information about a division pattern used for division of transmission unit data into a plurality of ranges;

performing non-orthogonal multiple access (NOMA) transmission processes on the plurality of ranges of the transmission unit data to be transmitted to a second communication device, wherein each of the NOMA transmission processes is signal processing for non-orthogonal multiple access, and the NOMA transmission processes, having same or different process contents, are performed on the plurality of ranges of the transmission unit data divided based on the division pattern information; and transmitting data obtained after the NOMA transmission processes to the second communication device.

17. A non-transitory computer-readable medium having stored thereon computer-executable instructions that, when executed by a processor in a first communication device, cause the processor to execute operations, the operations comprising:

transmitting division pattern information about a division pattern used for division of transmission unit data into a plurality of ranges, to a second communication device;

acquiring non-orthogonal multiple access (NOMA) transmission process information about a NOMA transmission process used by a second communication device configured to execute the NOMA transmission process, wherein the acquired NOMA transmission process information includes the transmitted division pattern information, and the NOMA transmission process is signal processing for non-orthogonal multiple access;

receiving multiplexed data being the transmission unit data transmitted from the second communication device, wherein the transmission unit data has a partial range on which the NOMA transmission process is performed; and separating the transmission unit data from the multiplexed data, based on the acquired NOMA transmission process information including the division pattern information.

* * * * *